(12) United States Patent
Sato

(10) Patent No.: US 8,670,143 B2
(45) Date of Patent: Mar. 11, 2014

(54) SYSTEM AND METHOD FOR UPDATING FIRMWARE OF AN IMAGE FORMING APPARATUS

(75) Inventor: Kei Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/440,462

(22) Filed: Apr. 5, 2012

(65) Prior Publication Data

US 2012/0257248 A1    Oct. 11, 2012

(30) Foreign Application Priority Data

Apr. 11, 2011    (JP) .................................. 2011-086935

(51) Int. Cl.
*G06F 3/12*    (2006.01)
*G06K 15/00*    (2006.01)

(52) U.S. Cl.
USPC ........................................ 358/1.15; 358/1.13

(58) Field of Classification Search
USPC ...................... 358/1.1, 1.13, 1.14, 1.15, 1.18; 709/201, 203, 217; 717/168, 170, 172, 717/173, 174, 176, 177, 178
See application file for complete search history.

(56) References Cited

U.S. PATENT DOCUMENTS

| | | | |
|---|---|---|---|
| 8,054,481 B2* | 11/2011 | Ikeno ........................... | 358/1.13 |
| 2006/0184927 A1* | 8/2006 | Deblaquiere et al. ......... | 717/168 |
| 2008/0189693 A1* | 8/2008 | Pathak ........................... | 717/168 |
| 2010/0169709 A1* | 7/2010 | Chiu et al. ...................... | 714/16 |

FOREIGN PATENT DOCUMENTS

JP    2009-140432 A    6/2009

* cited by examiner

*Primary Examiner* — Gabriel Garcia
(74) *Attorney, Agent, or Firm* — Canon USA Inc. IP Division

(57) ABSTRACT

An update control unit of an image forming apparatus notifies a start of application of firmware to a distribution server in a case where the application of the firmware delivered from the distribution server and stored in a HDD is started in response to an instruction from a user. The update control unit applies the firmware in a case where the response to permit the application of the firmware is received from the distribution server in reply to the notification, and does not apply the firmware in a case where the response prohibiting the application of the firmware is received from the distribution server in reply to the notification. The monitoring agent unit of the image forming apparatus periodically confirms to the monitoring server whether the firmware stored in the HDD before it is applied is to be deleted.

10 Claims, 21 Drawing Sheets

*1500*

| FW TYPE | STATUS | FW VERSION |
|---|---|---|
| iR ADV C2020JP | RELEASE-STOP | V59.63.00 |
| iR ADV C5051EN | RELEASED | V02.00.00 |
| iR ADV 6057JP | DELETED | V01.01.00 |
| . . . | . . . | . . . |

| DEVICE IDENTIFIER (1601) | DELIVERY ID (1602) | DELIVERY FW (1603) | FW VERSION (1604) | STATUS (1605) | RESULT (1606) |
|---|---|---|---|---|---|
| AAA00000 | 00000001 | iR ADV C2020JP | V59.63.00 | DOWNLOADED | — |
| AAA00001 | 00000002 | iR ADV C5051EN | V01.00.00 | COMPLETED | OK |
| AAA00002 | 00000003 | iR ADV 6057JP | V01.01.00 | COMPLETED | OK |
| ... | ... | ... | ... | ... | ... |

| 1701 | 1702 | 1703 | 1704 | 1705 | 1706 |
|---|---|---|---|---|---|
| DEVICE IDENTIFIER | STATUS | FW TYPE | FW VERSION | DELIVERY SCHEDULED FW | DELIVERY SCHEDULED FW VERSION |
| AAA00000 | DELETION RESERVED | iR ADV C2020JP | V59.63.00 | — | — |
| AAA00001 | DELIVERY RESERVED | iR ADV C5051EN | V01.00.00 | iR ADV C5051EN | V02.00.00 |
| AAA00002 | NORMAL | iR ADV 6057JP | V01.01.00 | — | — |
| ... | ... | ... | ... | ... | ... |

FIRST EXEMPLARY EMBODIMENT

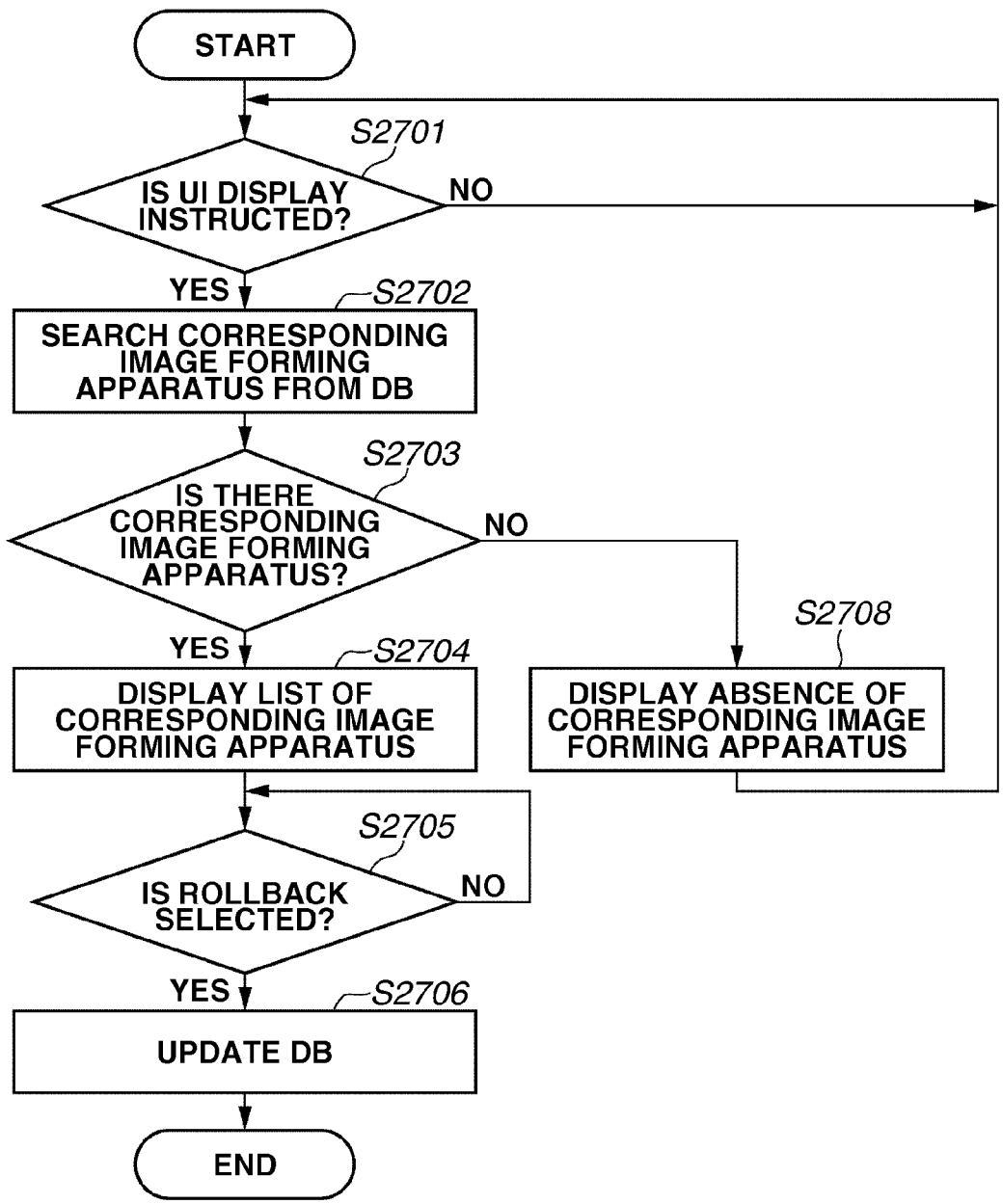

FIRST EXEMPLARY EMBODIMENT

SECOND EXEMPLARY EMBODIMENT

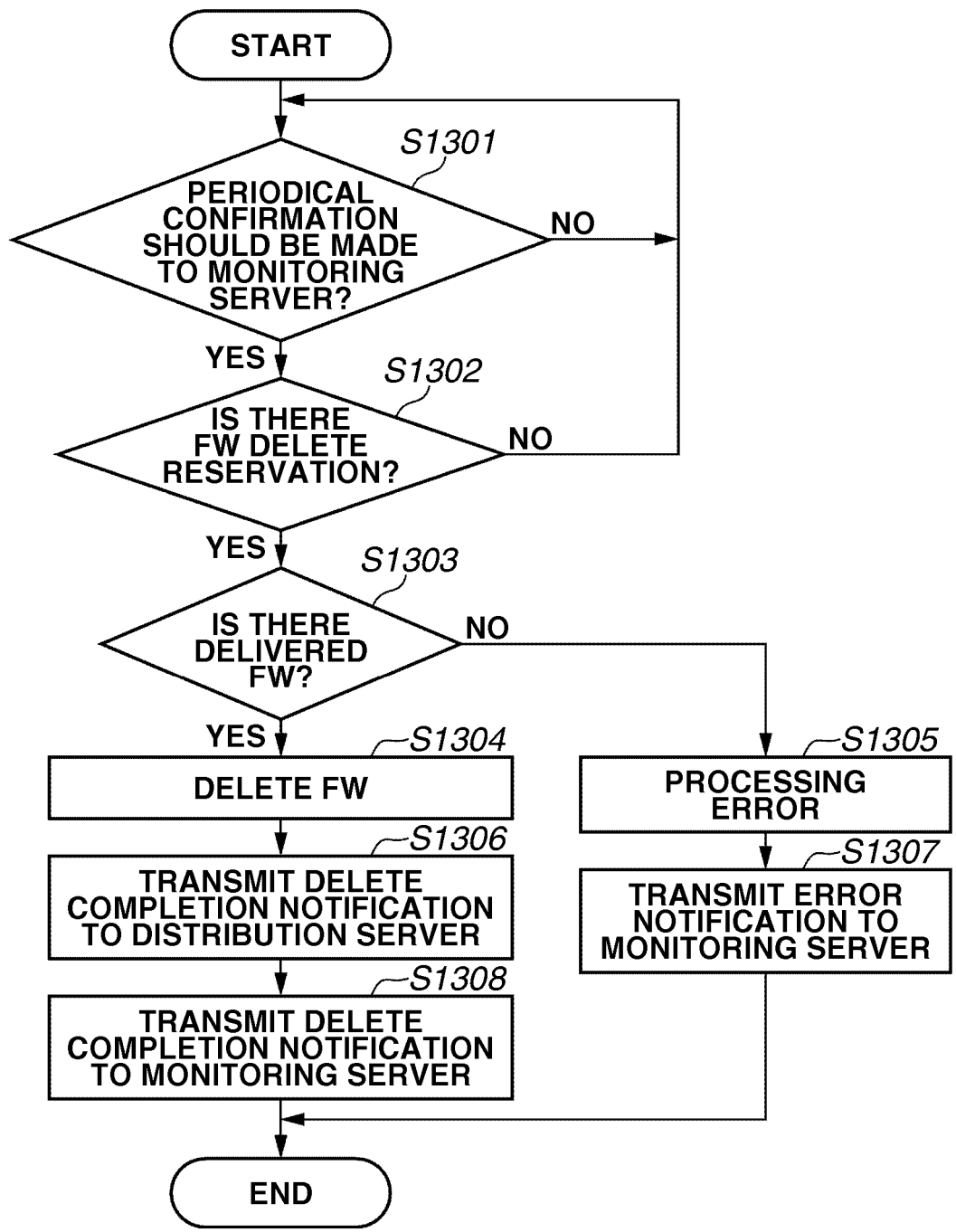

SECOND EXEMPLARY EMBODIMENT

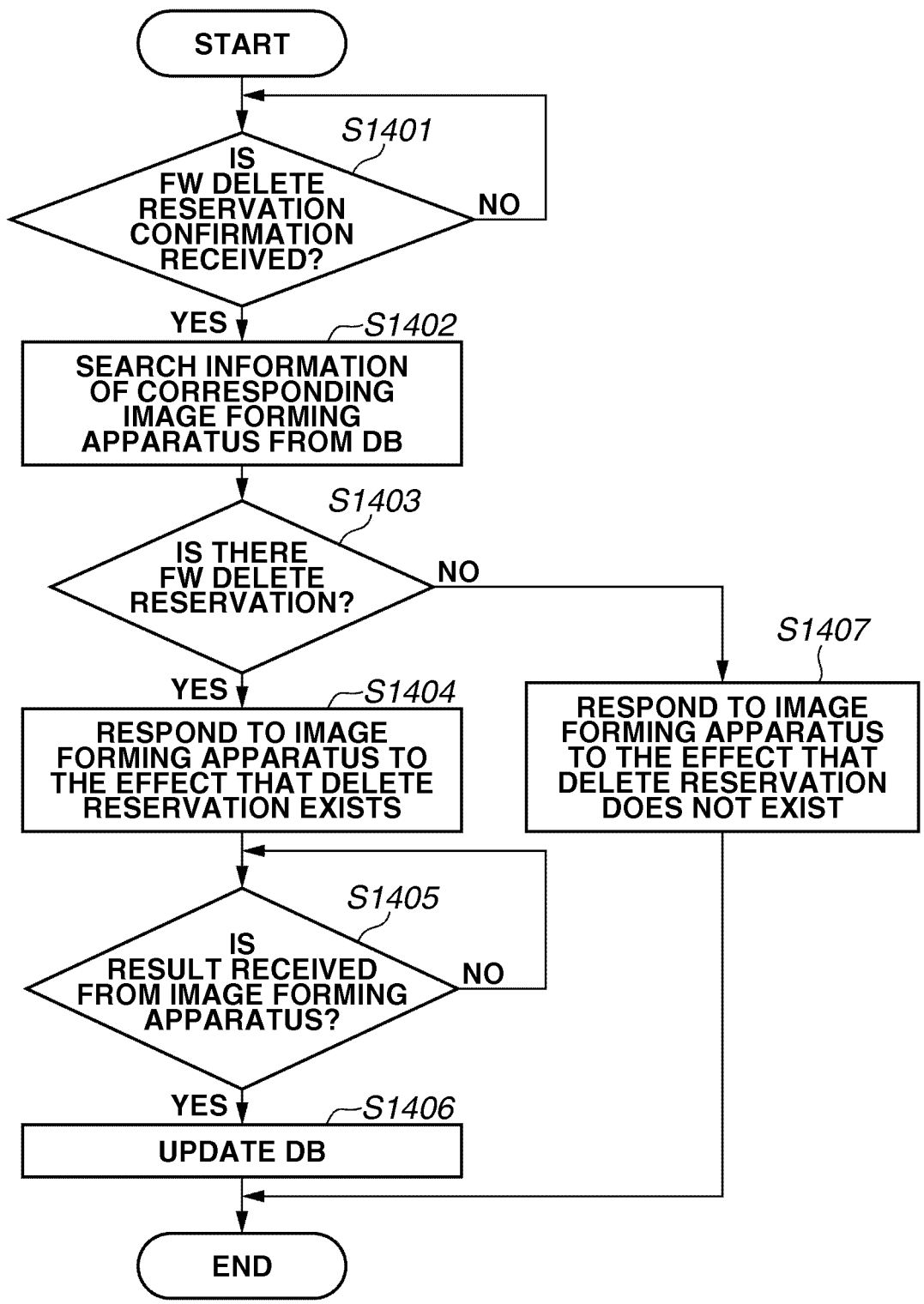

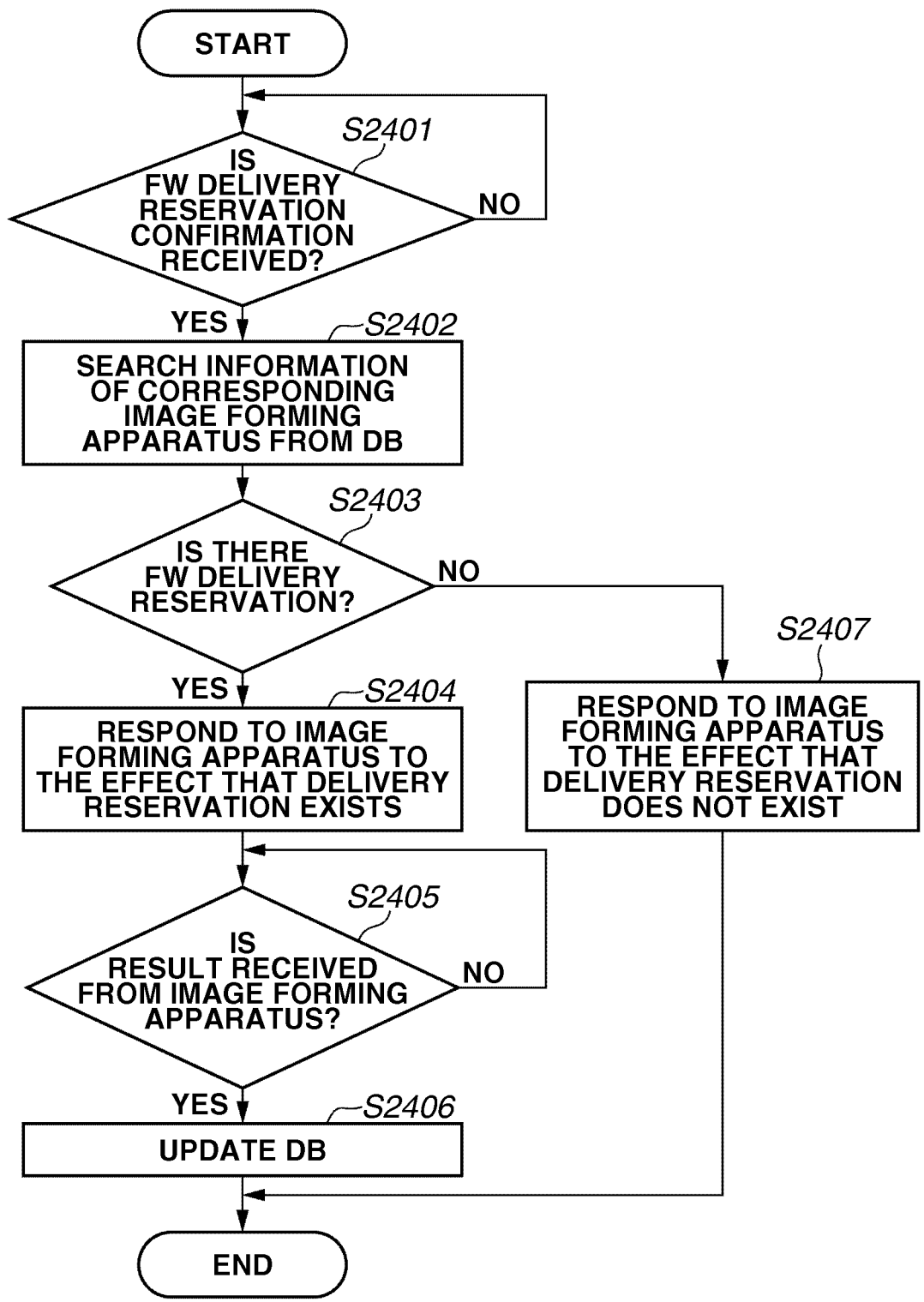

SYSTEM AND METHOD FOR UPDATING FIRMWARE OF AN IMAGE FORMING APPARATUS

BACKGROUND OF THE INVENTION

1. Field of the Invention

The present invention relates to a control for updating firmware of an image forming apparatus.

2. Description of the Related Art

In the recent image forming apparatus, a firmware update system that can automatically update firmware by delivering the firmware from a distribution server to the image forming apparatus has been realized in order to save costs for updating the firmware.

Even in the case of the system that can automatically update the firmware, manual updating performed by a serviceman is sometimes desired, for example, in a case where an operation of newly installed firmware is unstable.

Japanese Patent Laid-open Publication No. 2009-140432 proposes a system capable of switching an updating method of the firmware between an automatic updating and a manual updating. More specifically, at a side delivering the firmware, a user selects how to upload the firmware, i.e., whether the updating of the firmware is to be performed automatically or manually, via a user interface. At a side receiving the firmware, updating of the firmware is performed according to the selection, thereby realizing the switching of the updating of the firmware between the automatic updating and the manual updating.

In the system capable of manually applying the firmware after the delivery of the firmware as proposed in Japanese Patent Laid-open Publication No. 2009-140432, if a problem is found in the delivered firmware, there is such a problem that updating of the firmware including the problem cannot be limited.

In a case where there is a plurality of image forming apparatus 107 in which the delivered firmware having the problem remains, there is such a problem that the firmware with the problem cannot be deleted at once.

SUMMARY OF THE INVENTION

The present invention provides a system for preventing firmware to be applied to an image forming apparatus at a distribution source or for deleting the firmware therefrom, by an operation at a side of a delivery source of the firmware in a case where a problem is found in the delivered firmware.

According to an aspect of the present invention, an image forming apparatus communicable with a server system for delivering firmware includes a storing unit configured to store firmware after it is delivered from the server system and before it is applied, a notification unit configured to notify a start of application of the firmware to the server system in a case where application of the firmware stored in the storing unit to the image forming apparatus is started in response to an instruction from a user, a first application unit configured to perform control that the firmware is applied to the image forming apparatus in a case where a response to the effect that the application of the firmware is permitted is received from the server system in replay to the notification of the notification unit, and that the firmware is not applied to the image forming apparatus in a case where a response to the effect that the application of the firmware is prohibited is received, a first confirmation unit configured to periodically confirm whether the firmware stored in the storing unit before the application, is to be deleted, to the server system, and a delete unit configured to delete the firmware stored in the storing unit before the application in a case where a response to the effect that the firmware is to be deleted is received from the server system in reply to the confirmation of the first confirmation unit, wherein the response to the effect that the application of the firmware is prohibited is transmitted from the server system in order to prevent the application of the firmware that is in a release stop status in the server system during a period after the delivery of the firmware and before the start of the application of the firmware in the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 illustrates an example of delivery information held in the database.

FIG. 8 illustrates an example of the image forming apparatus information held in the database.

FIG. 9 is a sequence diagram illustrating an example of the whole processing for prohibiting an application of the firmware in the image forming apparatus, the distribution server, the monitoring server, and the like.

FIGS. 10A and 10B are flow charts illustrating processing for detecting the firmware in the distribution server and instructing control details.

FIGS. 16A and 16B are flow charts illustrating an example of confirmation processing performed in the image forming apparatus.

FIGS. 17A and 17B are flow charts illustrating an example of response processing performed in the monitoring server.

DESCRIPTION OF THE EMBODIMENTS

Various exemplary embodiments, features, and aspects of the invention will be described in detail below with reference to the drawings.

<System Configuration>

Figure 1:
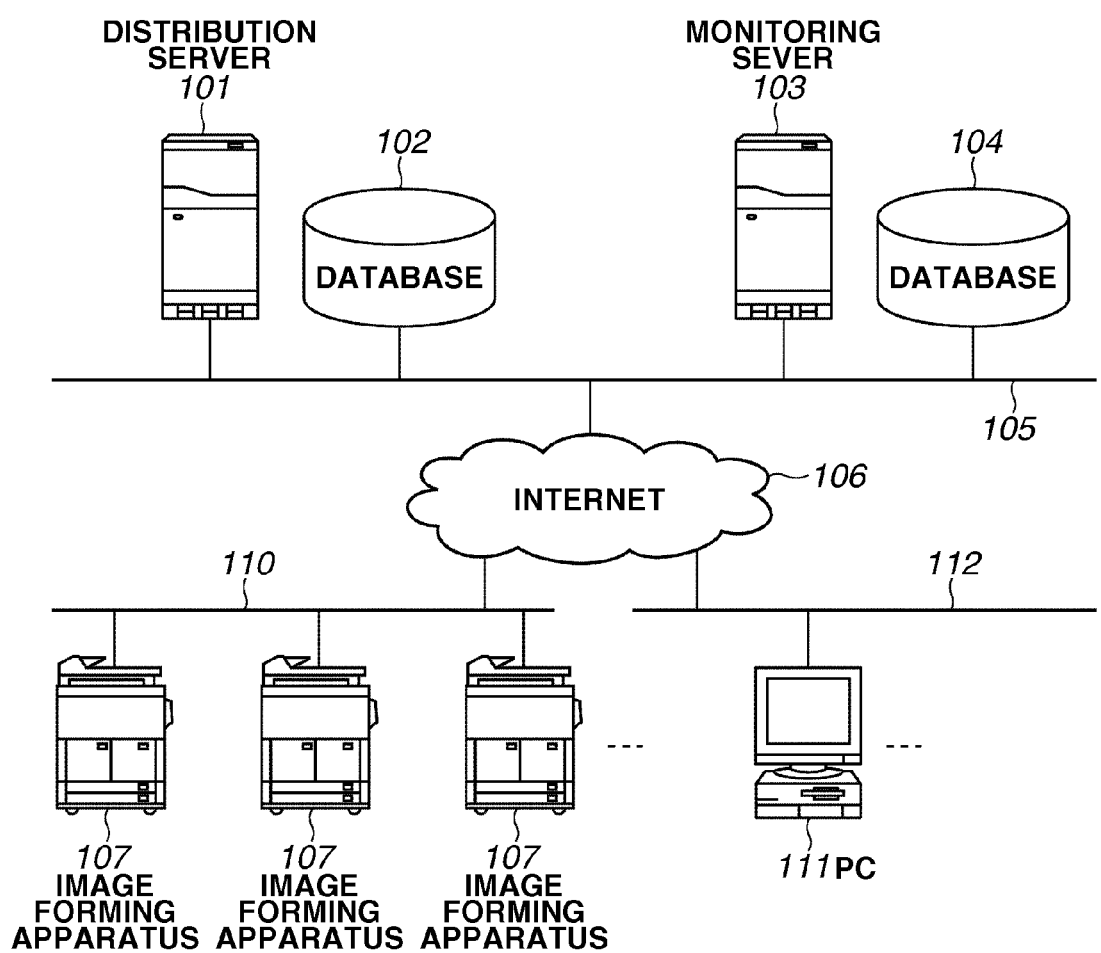
FIG. 1 illustrates an example of a firmware update system configuration to which a network system is applicable according to an exemplary embodiment of the present invention.

FIG. 1 illustrates an example of a configuration of a firmware update system to which a network system according to a first exemplary embodiment of the present invention is applicable.

As illustrated in FIG. 1, the network system of the present exemplary embodiment includes server systems and clients which are connected to an internet 106 so as to be communicable to each other.

First, a system configuration at a server side is described below. The server system, i.e., the server side, includes a monitoring server 103, a database 104, a distribution server 101, and a database 102.

The monitoring sever 103 monitors a single or a plurality of image forming apparatus 107 and has functions of collecting, storing, and processing information of the image forming apparatus 107 and information indicative of an operation status thereof (including failure information) in order to provide a warning or the like to the outside. For example, the monitoring server 103 has a function in the role of delivering the above described information to a personal computer 111 (hereinafter referred to as "PC"). Examples of the information indicative of the operating status include information about toner-out, an open-door, a drum exchange, no-cartridge, an abnormal cooling fan, an abnormal substrate, a dirty document positioning glass plate, a staple-out, or a shortage of a light amount of a sheet feeding sensor. Further examples of the information indicative of the operating status include information about a font memory overflow, a rendering error, an abnormal fixing device, an abnormal counter, an abnormal double-sided-print unit, or a paper jam.

Information of the image forming apparatus 107 to be monitored and settings relating to monitoring of the image forming apparatus can be registered in the monitoring server 103 through the PC 111. The monitoring server 103 can comprehensively control the image forming apparatus 107 that is to be monitored and registered through the PC 111 and the settings for monitoring the image forming apparatus 107 by merging them. The monitoring server 103 also can set the settings for monitoring the image forming apparatus 107.

The monitoring server 103 provides a Web page through which users can view the information stored in the database 104 or processed information, to the PC 111 connected via the internet 106. The monitoring server 103 provides the information via the Web page limiting viewable contents depending on each user's authority according to a user authentication. The monitoring server 103 also enables change of a portion of data via the Web page.

The database 104 works as a history storage unit that stores information for monitoring, a counter, failure history information, a failure pattern table, and the like of the image forming apparatus 107 (i.e., image processing apparatus) collected from a client side. The monitoring server 103 and the database 104 are connected to each other via a local area network (LAN) 105. The LAN 105 is connectable to the internet 106. The database 104 may physically exist in the monitoring server 103. The database 104 may exist anywhere via the internet 106 as far as the database 104 is accessible via the monitoring server 103.

The distribution server 101 has a function of managing the firmware of the image forming apparatus 107 and a function of delivering the firmware to the image forming apparatus 107. The distribution server 101 provides the Web page, through which the users can view information stored in the database 104 or processed information, to the PC 111 connected via the internet 106. The distribution server 101 provides the information via the Web page by limiting the viewable contents per each user authority according to the user authentication. The distribution server 101 can register, update, and delete the firmware applicable to the image forming apparatus 107 or change a portion of the data via the Web page.

The database 102 works as a history storage unit that stores the firmware, an application, software license information, and the like to be applied to the image forming apparatus 107. The distribution server 101 and the database 102 are connected each other via the LAN 105. The LAN 105 is connectable to the internet 106. The database 102 may physically exist in the distribution server 101. The database 102 may exist anywhere via the internet 106 as far as the database 102 is accessible via the distribution server 101. The database 102 and the database 104 may share data therebetween. The monitoring server 103 and the distribution server 101 do not necessarily exist on the same LAN.

In FIG. 1, only one device is illustrated for each of the monitoring server 103, the database 104, the distribution server 101, and the database 102. However, a plurality of servers and databases may share the operations of the above components in order to distribute loads of an information collection from many image forming apparatus 107 and monitoring systems (not illustrated), and a firmware delivery. The monitoring server 103, the database 104, the distribution server 101, and the database 102 may be configured into a single server apparatus.

The system configuration at the client side is described below. In the present exemplary embodiment, suitable examples of the image forming apparatus 107 may include a printer, a scanner, a facsimile, and a multifunction peripheral including the above functions. The image forming apparatus 107 is not limited to the multifunction peripheral but may be a single-function printer.

The image forming apparatus 107 communicates with the distribution server 101 via the internet 106 to perform downloading and updating of the firmware of its own. The image forming apparatus 107 transmits information of its own (e.g., an individual identifier, a kind and a version of firmware) to the distribution server 101 when updating the firmware.

The image forming apparatus 107 communicates with the monitoring server 103 via the internet 106 to transmit information of its own (e.g., counter information and occurrence of a failure) to the monitoring server 103.

The information of the image forming apparatus 107 may not only be directly collected to the monitoring server 103 from the image forming apparatus 107 but also may be collected by using a monitoring system (not illustrated) provided on the LAN 110. The monitoring system transmits status information (e.g., occurrence of the failure) of each image forming apparatus 107 to the monitoring sever 103 every time the monitoring system receives the status information from each image forming apparatus 107.

The PC 111 is provided with a Web browser and connected to the distribution sever 101 and the monitoring server 103 directly via the internet 106. Accordingly, the Web page provided by the above described distribution server 101 or the monitoring server 103 can be viewed.

<Hardware Configuration>

Figure 2:
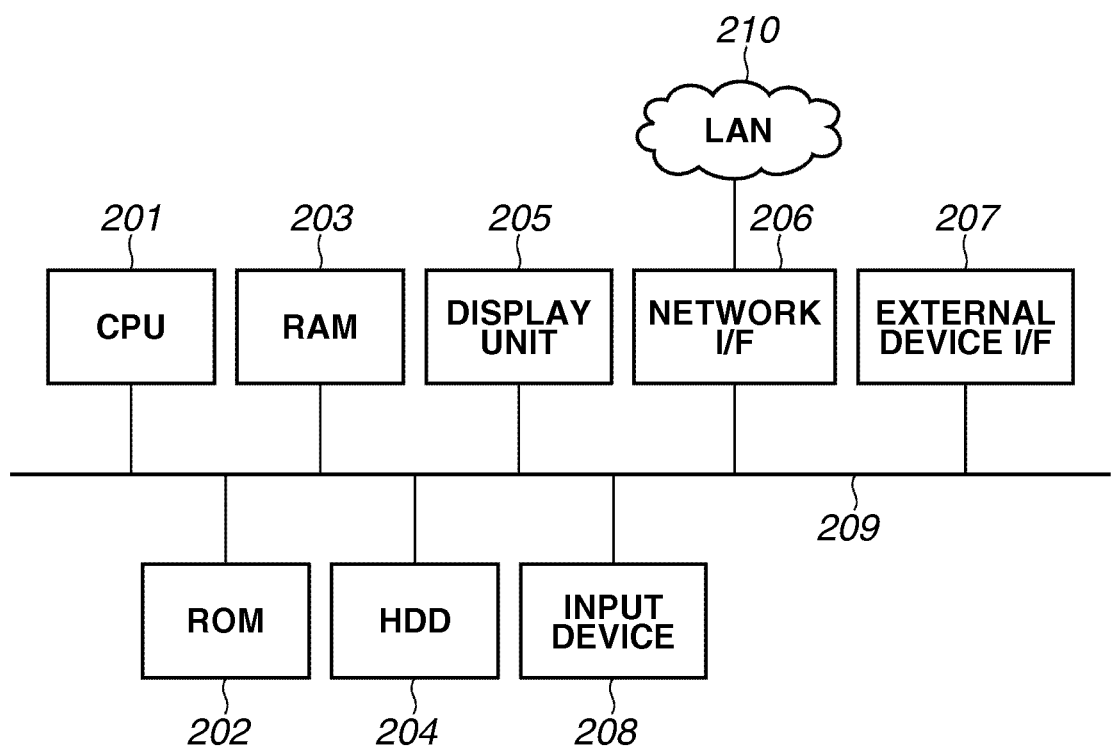
FIG. 2 is a block diagram illustrating an example of a hardware configuration of a monitoring server.

FIG. 2 is a block diagram illustrating an example of a hardware configuration of the monitoring server 103. The distribution server 101 and the PC 111 have the same hardware configuration.

In FIG. 2, the CPU 201 reads out and execute a program that is computer readably recorded in a read only memory (ROM) 202, a hard disk drive (hereinafter referred to as "HDD") 204, and the like, thereby controlling each processing performed on the present apparatus. The ROM 202 stores a program and data relating to each processing of the present apparatus. A random access memory (RAM) 203 electrically stores temporal data relating to each processing of the present apparatus. The RAM 203 is used as a work area of the CPU 201.

The HDD 204 stores the program and the data relating to each processing of the present apparatus, the temporal data, the information about the image forming apparatus 107 to be monitored according to the present exemplary embodiment, the information collected from the image forming apparatus 107, and the like. For example, the HDD 204 stores a parts counter, a charging counter, and a division counter. In the PC 111, the HDD 204 also stores, for example, a program of the Web browser.

An input device 208 includes a keyboard and a pointing device through which an instruction is input into the present apparatus. A display unit (i.e., display device) 205 displays an operation status of the present apparatus and information output from each program running on the present apparatus. A network interface (Network I/F) 206 is connected to a LAN 210 and the internet 106 via a network, thereby performing an exchange of information with the outside. An external device I/F 207 serves to connect an external storage device and the like. The above described components 201 through 208 are connected to each other via a system bus 209 to exchange data.

Figure 3:
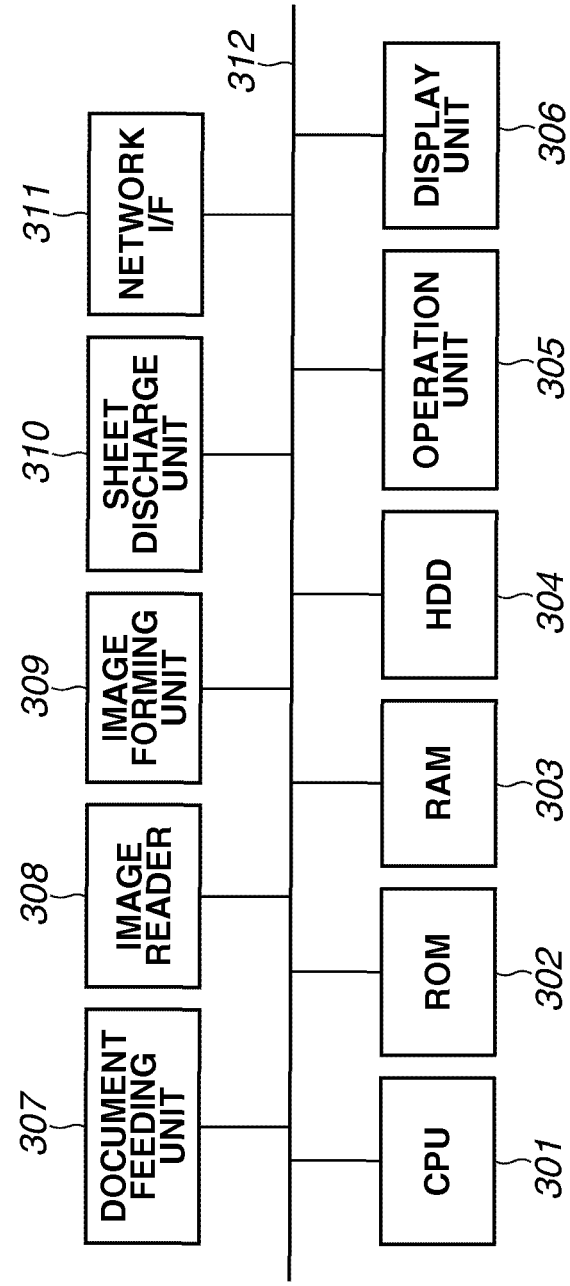
FIG. 3 is a block diagram illustrating an example of a hardware configuration of an image forming apparatus.

A storage device other than the HDD such as a Solid Status Drive (SSD) may be used instead of the HDD. FIG. 3 is a block diagram illustrating an example of a hardware configuration of the image forming apparatus 107. Specific examples of the image forming apparatus 107 include the multifunction peripheral integrally having functions of the printer and the facsimile, the printer that receives data from the PC 111 or the like and prints the data (including an electrophotographic printer and an ink jet printer), a scanner, and a facsimile. FIG. 3 illustrates a configuration of the multifunction peripheral as an example of the image forming apparatus 107.

In FIG. 3, an image reader 308 reads image data from a document fed by a document feeding unit 307. An image forming unit 309 converts the image data read from the document by using the image reader 308 and data received via the network into a print image and prints out the print image. A sheet discharge unit 310 discharges papers printed out by the image forming unit 309 to provide processing such as sorting and stapling, to the papers.

A Network I/F 311 is connected to the LAN 110 and the internet 106 via the network, thereby performing an exchange of information with the outside. A CPU 301 reads out a program that is computer readably stored in a read only memory (ROM) 302 and a hard disk drive (HDD) 304 and executes the program, thereby controlling each processing performed on the present apparatus. The CPU 301 monitors the operation status of the image forming apparatus 107 based on the program and, in a case where a specific event such as a failure occurs, transmits status information indicating the status of the specific event to a predetermined transmission destination. Examples of the transmission destination include a monitoring server 103 and a monitoring system (not illustrated).

The ROM 302 as a nonvolatile storage unit stores a program and data relating to each processing of the present apparatus. The RAM 303 electrically stores temporal data relating to each processing of the present apparatus. The RAM 303 is used as a work area of the CPU 301.

The HDD 304 stores a program and data relating to each processing of the present apparatus, temporal data, user data transmitted to the present apparatus, and the like. The firmware downloaded from the distribution server 101 is temporally stored in the HDD 304 before the firmware is applied.

An operation unit 305 includes a hard key and a touch panel, and receives input of an instruction to the present apparatus. A display unit (i.e., display device) 306 displays information relating to an operation status of the present apparatus and an operation with respect to the operation unit. The above described components 301 through 311 are connected to each other via a system bus 312 to transmit data therebetween.

In the image forming apparatus 107 having a function of actively transmitting information for monitoring the image forming apparatus itself, the program and data relating to monitoring data transmission processing are held within the ROM 302 or the HDD 304 to be executed by the CPU 301. A storage device other than the HDD such as a Solid Status Drive (SSD) may be used instead of the HDD.

<Software Configuration>

Figure 4:
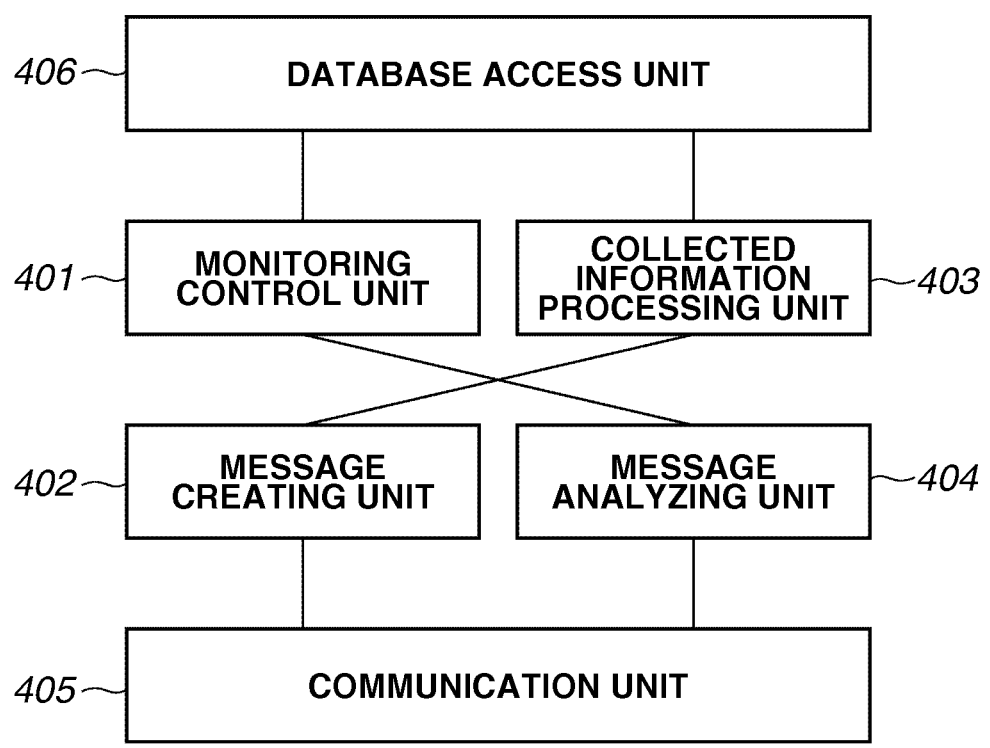
FIG. 4 is a block diagram illustrating an example of a software configuration according to the present exemplary embodiment in the monitoring server and a distribution server 101.

FIG. 4 is a block diagram illustrating an example of a software configuration according to the present exemplary embodiment in the monitoring server 103 and the distribution server 101.

In FIG. 4, a communication unit 405 transmits data received from the monitoring system (not illustrated) or the image forming apparatus 107 via the network I/F 206 to a message analyzing unit 404. The message analyzing unit 404 analyzes the data. The communication unit 405 transmits data created by a message creating unit 402 to the monitoring system (not illustrated) or the image forming apparatus 107 via the network I/F 206.

A collected information processing unit 403 stores information received from the monitoring system (not illustrated) in the database 104 and the database 102 via a database access unit 406, with the information being as it is or after processed. The collected information processing unit 403 realizes a function relating to a remote monitoring system. For example, the collected information processing unit 403 notifies the latest information of the firmware to a notification destination of, for example, an administrator in charge based on the data received from the image forming apparatus 107 under the supervision and the data stored in the database 104 and the database 102. The collected information processing unit 403 notifies counting of counter information, error information, and the like in addition to the latest information of the firmware to the notification destination of, for example, the administrator.

The monitoring control unit 401 performs schedule management for acquiring information of the image forming apparatus 107 and control of the monitoring contents and the monitoring method. The monitoring control unit 401 transmits an instruction to the image forming apparatus 107 under the supervision, as required, via the message creating unit 402, the communication unit 405, and the network I/F 206. The message creating unit 402 creates message data.

Figure 5:
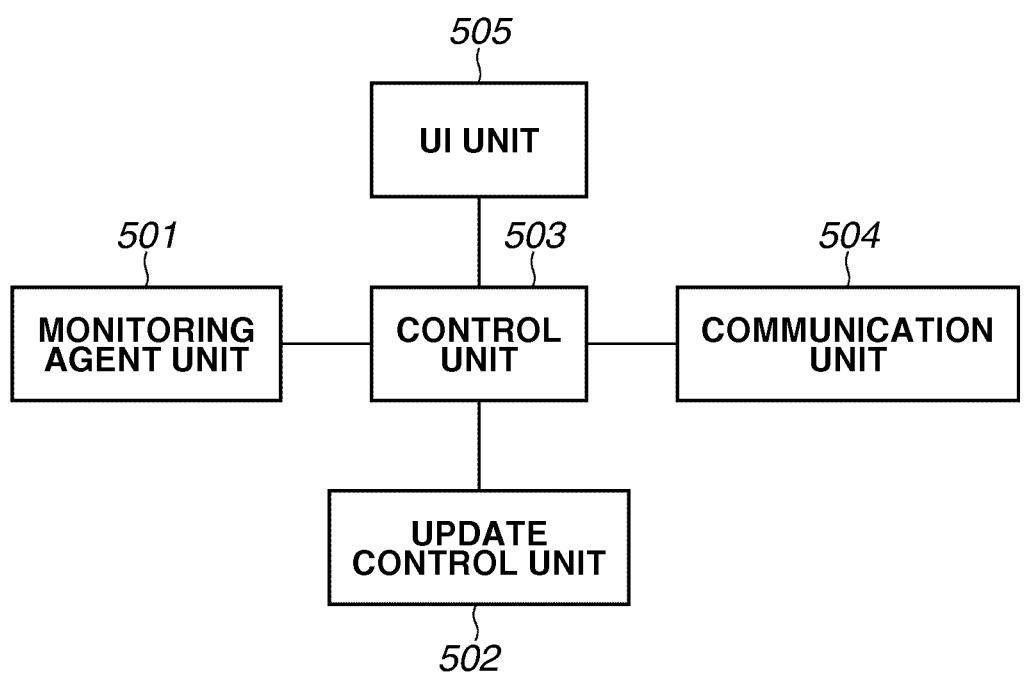
FIG. 5 is a block diagram illustrating an example of a software configuration according to the present exemplary embodiment in the image forming apparatus.

FIG. 5 is a block diagram illustrating an example of a software configuration according to the present exemplary embodiment in the image forming apparatus 107. In FIG. 5, a communication unit 504 transmits the data received from the monitoring server 103 and the distribution server 101 via the network I/F 311 to a monitoring agent unit 501. The communication unit 504 transmits the data created by the monitoring agent unit 501 to the monitoring server 103 and the distribution server 101 via the network I/F 311.

The monitoring agent unit 501 acquires counter information held in the image forming apparatus 107 according to a schedule set within the image forming apparatus 107 or an instruction from the monitoring server 103 and further acquires information of, for example, a service call, jamming, and an toner-out occurring in the image forming apparatus 107. The data acquired by the monitoring agent unit 501 is transmitted to the communication unit 504 without processing and further transmitted to the monitoring server 103. The data acquired by the monitoring agent unit 501 is stored, interpreted, and processed within the monitoring agent unit 501 to be transmitted to the communication unit 504, or can be transmitted to the monitoring server 103.

A user interface unit (UI unit) 505 processes input from the operation unit 305 and displays a screen on the display unit 306, i.e., handles processing relating to a user interface. An update control unit 502 acquires firmware information held in the image forming apparatus 107 according to a schedule within the image forming apparatus 107 or an instruction from the distribution server 101. The data acquired by the update control unit 502 is transmitted to the communication unit 504 without processing and further transmitted to the distribution server 101. The data acquired by the update control unit 502 is stored, interpreted, and processed within the update control unit 502 to be transmitted to the communication unit 504 or can be transmitted to the distribution server 101.

A control unit 503 comprehensively controls the monitoring agent unit 501, the UI unit 505, the communication unit 504, and the update control unit 502 to assign a hardware resource or a software resource to each unit.

Figure 6:
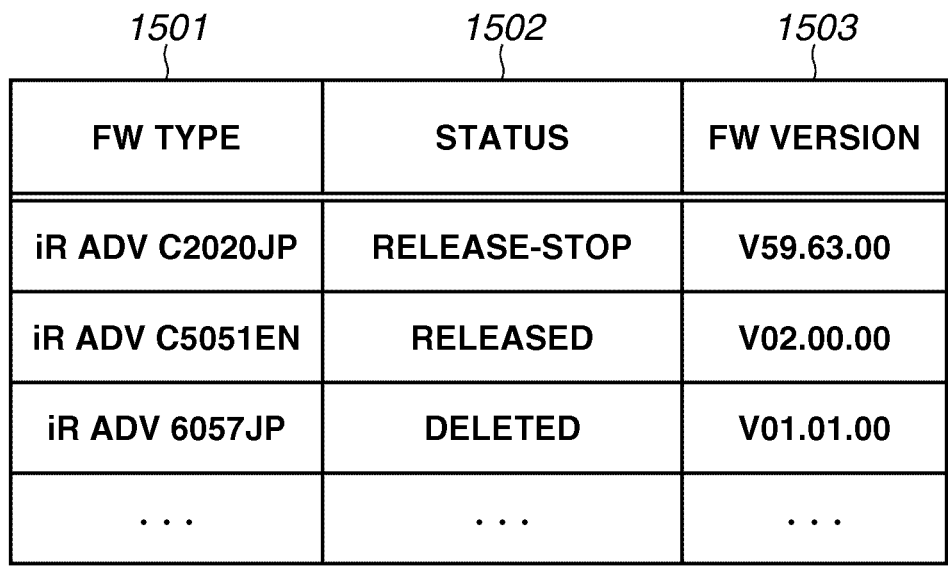
FIG. 6 illustrates an example of firmware information held in a database.

FIG. 6 illustrates an example of firmware information held in the database 102. In FIG. 6, firmware information 1500 is updated by the monitoring control unit 401 based on firmware information input by a registrant when the firmware is registered in the distribution server 101.

An FW type 1501 represents types of the firmware registered in the distribution server 101. In a case where the firmware differs according to a type of the image forming apparatus 107, the firmware is differentiated according to the FW type 1501.

A status 1502 represents a status of the firmware registered in the distribution server 101. Values of the status 1502 are represented by, for example, "released" if the firmware is in a deliverable status, "release stop" if the firmware is suspended from delivery due to some problem found in the firmware, and "deleted" if the firmware is deleted from the distribution server 101.

An FW version 1503 represents a version of the firmware registered in the distribution server 101. Even when the firmware has the same FW type 1501, since a plurality of versions of firmware can be registered in the distribution server 101, this item is still needed.

FIG. 7 illustrates an example of delivery information to be held in the database 102. In FIG. 7, delivery information 1600 is updated by the monitoring control unit 401 every time the firmware is delivered from the distribution server 101 to the image forming apparatus 107. A device identifier 1601 uniquely identifies the image forming apparatus 107 that is a distribution destination of the firmware. The device identifier 1601 may be a serial number of the image forming apparatus 107. A delivery ID 1602 is uniquely assigned to the firmware every time the distribution server 101 delivers the firmware. The delivery ID 1602 is used in order to discriminate the present delivery from the other delivery.

A delivery FW 1603 represents a type of the firmware delivered by the distribution server 101. The FW type 1501 of the firmware information 1500 representing the firmware to be delivered is used as the delivery FW 1603.

An FW version 1604 represents a version of the firmware delivered by the distribution server 101. The FW version 1503 of the firmware information 1500 representing the firmware to be delivered is used as the FW version 1604.

A status 1605 represents a status of delivery. Values of the status 1605 are represented by "in delivery" if the firmware is in the process of transmission to the image forming apparatus 107, "downloaded" if the transmission of the firmware is completed, and "completed" if the application of the firmware is also completed.

A result 1606 represents a result of delivery. Values of the result 1606 are represented by "OK" if the delivery ends in success, "NG" if the delivery ends in failure, and "yet to be input" if the firmware is in the process of delivery.

The distribution server 101 adds a new record to the delivery information 1600 when the distribution server 101 receives an instruction for a start of the delivery of the firmware from the Web browser of the PC 111. At the time, the status 1605 becomes "in delivery".

FIG. 8 illustrates example of image forming apparatus information 1700 held in the database 104. The image forming apparatus information 1700 is held in the database 104 for each image forming apparatus that is monitored by the monitoring server 103. A device identifier 1701 uniquely represents the image forming apparatus 107 as the distribution destination. The serial number or the like of the device may be used as the device identifier 1701. A status 1702 represents a status of the image forming apparatus 107 that is represented by the device identifier 1701. Values of the status 1702 are represented by "deletion reserved" if the deletion of the delivered firmware is reserved, "delivery reserved" if the delivery of the firmware is reserved, "application prohibited" if prohibiting an application of the delivered firmware is instructed, and "normal" if the image forming apparatus 107 operates normally.

An FW type 1703 represents a type of the firmware installed, at the time, in the image forming apparatus 107 represented by the device identifier 1701. An FW version 1704 represents a version of the firmware installed, at the time, in the image forming apparatus 107 represented by the device identifier 1701. A delivery scheduled FW 1705 represents a type of the firmware scheduled to be delivered in a case where a value of the status 1702 is "delivery reserved". The FW type 1501 of the firmware information 1500 is used as information representing the type of the firmware scheduled to be delivered.

A delivery scheduled FW version 1706 represents a version of the firmware scheduled to be delivered in a case where the value of the status 1702 is "delivery reserved". The FW version 1503 of the firmware information 1500 is used as the information representing the firmware scheduled to be delivered.

Although it is not illustrated in FIG. 7, the image forming apparatus information 1700 also stores a date and time at which the firmware is delivered and automatic application information thereof in addition to the above described information 1701 through 1706. The automatic application information (not illustrated) represents information whether the firmware scheduled to be delivered is to be automatically applied in a case where the value of the status 1702 is "delivery reserved". An "automatic application" is stored in a case where the firmware is automatically applied. A "manual application" is stored in a case where the automatic application is not performed. In the present exemplary embodiment, "manual application" is to be stored in the automatic application information in a normal delivery of the firmware.

Figure 9:
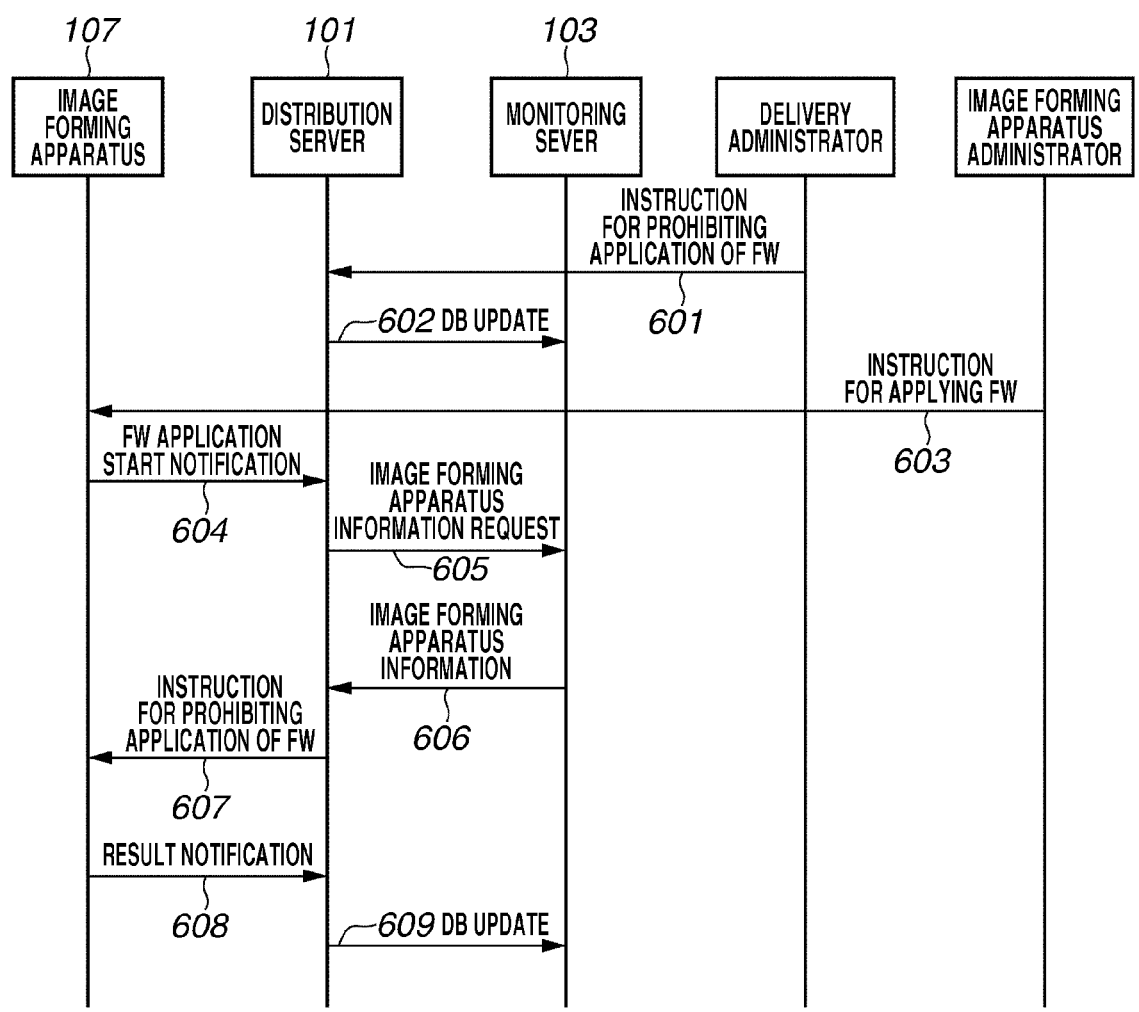

FIG. 9 is an entire sequence illustrating an example of processing for prohibiting the application of the firmware in the image forming apparatus 107, the distribution server 101, the monitoring server 103, and the like. The firmware applicable to the image forming apparatus 107 is preliminarily uploaded to the distribution server 101. Further, the firmware is preliminarily delivered from the distribution server 101 to the image forming apparatus 107. Still further, the status 1502 of the firmware information 1500 is updated to "release-stop" or "deleted" in the firmware in which a problem is found according to an instruction input via the Web browser of the PC 111 from the delivery administrator.

In step S601, the distribution server 101 performs control that an instruction for prohibiting the application of the firmware or an instruction for deleting the firmware, in which a problem is found, can be received from the delivery administrator. The delivery administrator transmits the instruction to prohibit the application of the firmware or delete the firmware delivered from the PC 111 and the like to the server 101.

In step S602, in a case where the distribution server 101 receives the instruction to prohibit the application of the firmware or delete the firmware, the distribution server 101 requests the monitoring server 103 to update the database 104.

In a case where the monitoring server 103 receives the request for the update of the database 104, the monitoring serer 103 stores information that the application of the firmware is prohibited or the deletion of the firmware is reserved with respect to the corresponding image forming apparatus 107, in the database 104. In other words, the monitoring server 103 updates the status 1702 of the image forming apparatus information 1700 of the corresponding image forming apparatus 107 to "application prohibited" or "deletion reserved". Processing performed in the above described steps S601 and S602 are described below in detail with reference to FIG. 10A.

In step S603, the image forming apparatus 107 subsequently receives an instruction to apply the delivered firmware from the administrator of the image forming apparatus 107 via the operation unit 305. In step S604, the image forming apparatus 107 notifies a firmware application start notification to the distribution server 101.

In step S605, the distribution server 101 after receiving the firmware application start notification makes an information acquisition request to the monitoring server 103 in order to acquire the information of the image forming apparatus 107 that is a receiving source.

In step S606, the monitoring server 103 after receiving the information acquisition request acquires the image forming apparatus information 1700 of the corresponding image forming apparatus 107 from the database 104 to transmit the acquired information to the distribution server 101.

The distribution server 101 after acquiring the image forming apparatus information 1700 of the corresponding image forming apparatus 107 determines whether the corresponding image forming apparatus 107 is the one to which the application of the firmware is prohibited or is the one which needs the deletion of the firmware based on thus acquired image forming apparatus information 1700. In other words, the distribution server 101 determines whether the status 1702 is "application prohibited" or "to be deleted".

In step S607, the distribution server 101 makes a reply to the above described firmware application start notification with respect to the image forming apparatus 107 according to the above described determination. More specifically, the distribution server 101 makes a reply of "firmware application prohibition instruction" in a case where the status 1702 is "application prohibited", while the distribution server 101 makes a reply of "instruction to delete firmware" in a case where the status 1702 is "to be deleted".

In step S608, the firmware is not applied to the image forming apparatus 107 but the image forming apparatus 107 notifies a result of the processing to the distribution server 101 in a case where the application prohibition of the firmware is instructed according to the reply of the firmware application start notification from the distribution server 101.

In step S608, the image forming apparatus 107 deletes the delivered firmware in a case where the deletion of the firmware is instructed and notifies the result thereof to the distribution sever 101. In step S609, the distribution server 101 after receiving the result requests updating of the image forming apparatus information 1700 of the corresponding image forming apparatus 107 to the monitoring server 103. The monitoring server 103 updates the status 1702 of the corresponding image forming apparatus 107 (e.g., updates the status to "normal").

The processing of the above described steps S605 through S609 in the distribution server 101 are described below in detail with reference to FIG. 12. The process ing of the above described steps S604 through S608 in the image forming apparatus 107 are described below in detail with reference to FIGS. 13 through 15.

Figure 10A:
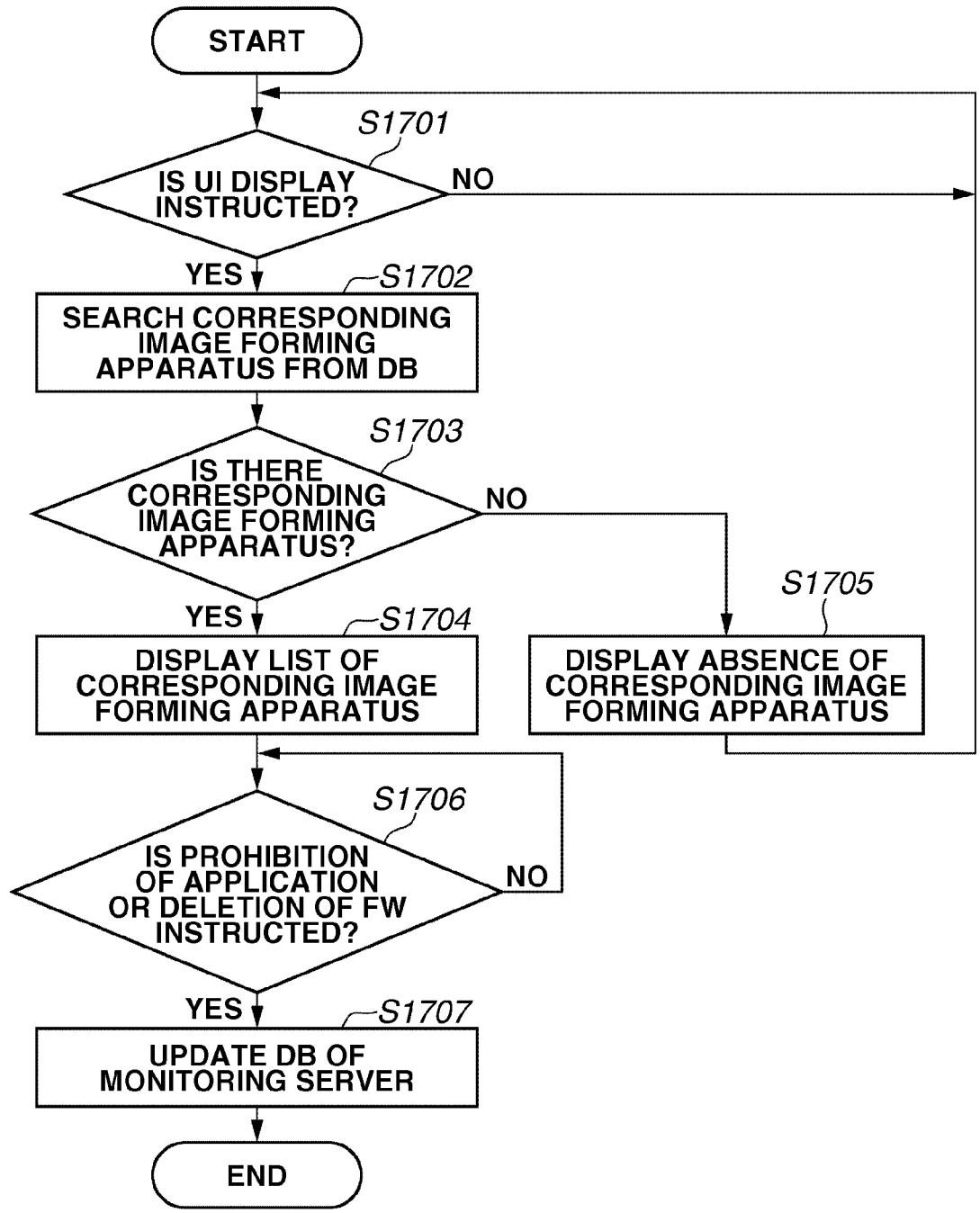

FIG. 10A is a flow chart illustrating an example of the detailed processing performed during a period from the application prohibition instruction (S601) to the DB updating (S602) in the distribution server 101 of the first exemplary embodiment. The processing of each step of the flow chart is performed by the monitoring control unit 401 of the distribution server 101, unless otherwise noted. More specifically, the processing of each step of the flow chart is realized by the CPU 201 of the distribution server 101 reading out a program stored in the HDD 204 (i.e., program for realizing a function of the monitoring control unit 401) into the RAM 203 and executing the program.

In step S1701, the monitoring control unit 401 of the distribution server 101 receives a request to display a list of the image forming apparatus 107, in which a specific release-stop firmware is delivered from the delivery administrator and stored as it is in the image forming apparatus 107, via the communication unit 405 of the distribution server 101. The request here is transmitted from the Web browser of the PC 111.

In step S1702, in a case where the monitoring control unit 401 of a distribution sever 101 receives the list-display request (YES in step S1701), the monitoring control unit 401 uses the database access unit 406 of the distribution server 101 to search the corresponding image forming apparatus 107 based on the firmware information 1500 and the delivery information 1600 in the database 102 (first detection). More specifically, the monitoring control unit 401 of the distribution server 101 acquires values of the FW type 1501 and the FW version 1503 of the record in which a value of the status 1502 of the firmware information 1500 is a "release stop". Further, the monitoring control unit 401 of the distribution server 101 searches the device identifier 1601 (i.e., corresponding image forming apparatus) in which delivery FW 1603 and FW version 1604 coincide with the FW type 1501 and the FW version 1503 of the above acquired "release stop" and status 1605 is "downloaded", from the delivery information 1600. The monitoring control unit 401 of the distribution server 101 acquires values of the FW type 1501 and the FW version 1503 of the record in which the value of the status 1502 of the firmware information 1500 is "release stop" or "deleted".

In a case where the value of the status 1502 of the firmware information 1500 of anyone of the firmware is changed to "release stop" or "deleted" according to the instruction from the Web browser of the PC 111, the monitoring control unit 401 of the distribution server 101 may start the processing on and after step S1702 considering that the monitoring control unit 401 receives the request for the display of the list of the image forming apparatus 107 in which the specific release stop firmware is held as delivered from the delivery administrator in step S1701.

The monitoring control unit 401 of the distribution server 101 subsequently determines whether the corresponding device identifier 1601 (i.e., corresponding image forming apparatus) exists based on the retrieval result performed in step S1702. As the retrieval result, in a case where the monitoring control unit 401 determines that the corresponding device identifier 1601 (i.e., corresponding image forming apparatus) exists (YES in step S1703), in step S1704, the monitoring control unit 401 of the distribution server 101 transmits the list (FIG. 11A) of the image forming apparatus corresponding to the device identifier 1601 to the Web browser of the PC 111. The Web browser of the PC 111 displays the list (FIG. 11A) of the image forming apparatus.

Figure 11A:
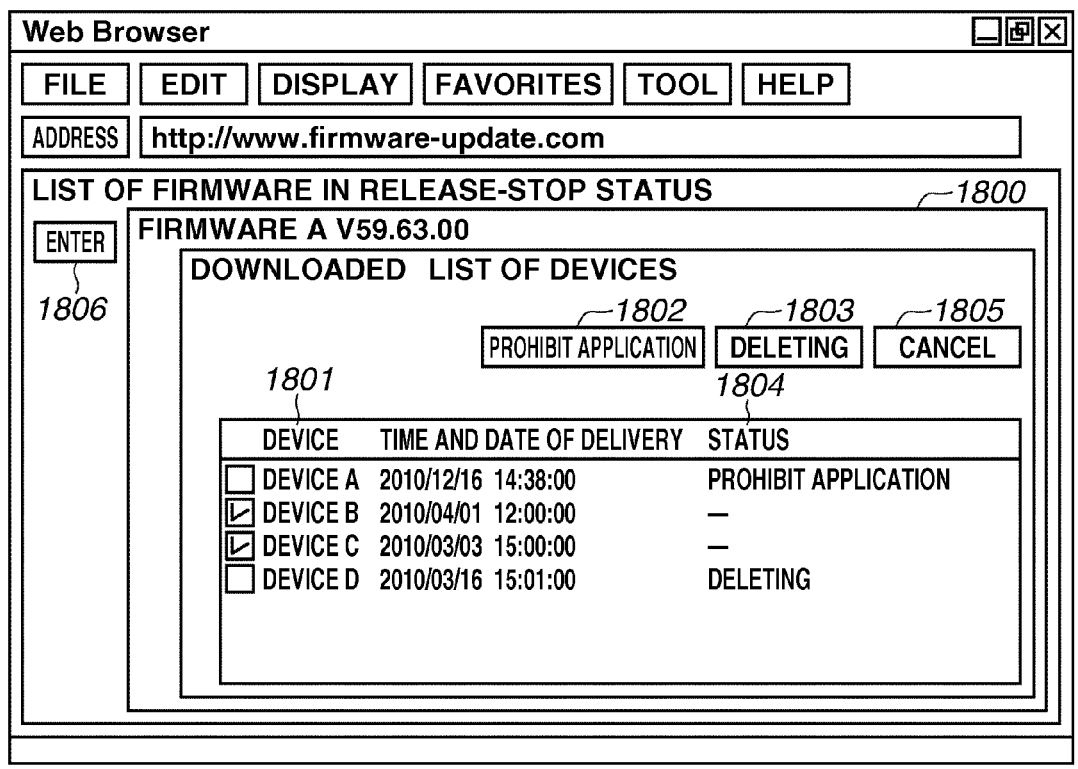
FIGS. 11A and 11B illustrate an example of a user interface (UI) (screen) displayed on a display unit of a Web browser of a personal computer (PC), respectively.

In step S1706, the monitoring control unit 401 of the distribution server 101 waits for an instruction via FIG. 11A (i.e., first instruction) to be transmitted from the Web browser of the PC 111.

FIG. 11A illustrates an example of a UI (screen) displayed on the display unit 205 of the Web browser of the PC 111 in step S1704 of FIG. 10A. In the UI illustrated in FIG. 11A, a list screen 1800 of downloaded devices is displayed for each release-stop firmware. In each screen 1800, a single or a plurality of image forming apparatus can be selected from the list of the image forming apparatus 1801. Prohibition of the application of the firmware can be instructed with respect to the selected image forming apparatus by pressing an application prohibition button 1802. Alternatively, deletion of the firmware can be designated by pressing a delete button 1803. The application prohibition or delete designation can be cancelled by selecting the image forming apparatus of which status 1804 is "application prohibited" or "deleting" and pressing a cancel button 1805. In a screen of FIG. 11A, when an "application prohibition" button 1802, a "delete" button 1803, or a "cancel" button 1805 is pressed, the screen is controlled to display contents according to the instruction in a status display column 1804 based on a program installed in the screen.

When an "enter" button 1806 is pressed, the identifier 1801 and the status thereof 1804 and the like of the image forming apparatus 1801 displayed in each screen 1800 are transmitted from the Web browser of the PC 111 to the distribution server 101.

Now, the description returns to the flow chart of FIG. 10A. In a case where the monitoring control unit 401 of the distribution server 101 determines that the instruction on the UI of FIG. 11A transmitted from the Web browser of the PC 111 includes the instruction for the application prohibition or deletion of the firmware or instruction for cancellation of the application prohibition or the deletion of the firmware (YES in step S1706), processing proceeds to step S1707.

In step S1707, the monitoring control unit 401 of the distribution server 101 requests updating of the database 104 to the monitoring server 103 based on the instruction on the UI and ends the processing of the present flow chart.

As specific update contents that the distribution server 101 requests for to the monitoring server 103, the value of the status 1702 of the image forming apparatus information 1700 corresponding to the identifier of the image forming apparatus to which "application prohibition" is instructed is changed to "application prohibited". Further, as the specific update contents that the distribution server 101 requests for to the monitoring server 103, the value of the status 1702 of the image forming apparatus information 1700 corresponding to the identifier of the image forming apparatus to which "delete" is instructed is changed to "deletion reserved". Still further, as the specific update contents, the value of the status 1702 of the image forming apparatus information 1700 corresponding to the identifier of the image forming apparatus to which cancel of "application prohibited" or "delete" is instructed, is changed to "normal".

Although not illustrated in FIG. 10A, in a case where there is no reply from the Web browser of the PC 111 which displays the UI, for a predetermined time, the processing of the present flow chart is ended without any change.

In step S1703, in a case where the monitoring control unit 401 of the distribution server 101 determines that there is no corresponding device identifier 1601 (i.e., corresponding image forming apparatus) based on the retrieval result performed in step S1702 (NO in step S1703), in step S1705, the monitoring control unit 401 of the distribution server 101 displays to that effect on the UI. Then, the processing returns to step S1701.

FIG. 10A illustrates a configuration that causes the user to select the image forming apparatus in which application of the delivered firmware is prohibited in the displayed UI of FIG. 11A. However, in step S1702, the monitoring control unit 401 of the distribution server 101 may search the corresponding image forming apparatus from the DB and performs processing for updating the DB of step S1707 considering that "application prohibition" is instructed to all the searched corresponding image forming apparatus without displaying the UI of FIG. 11A.

Figure 12:
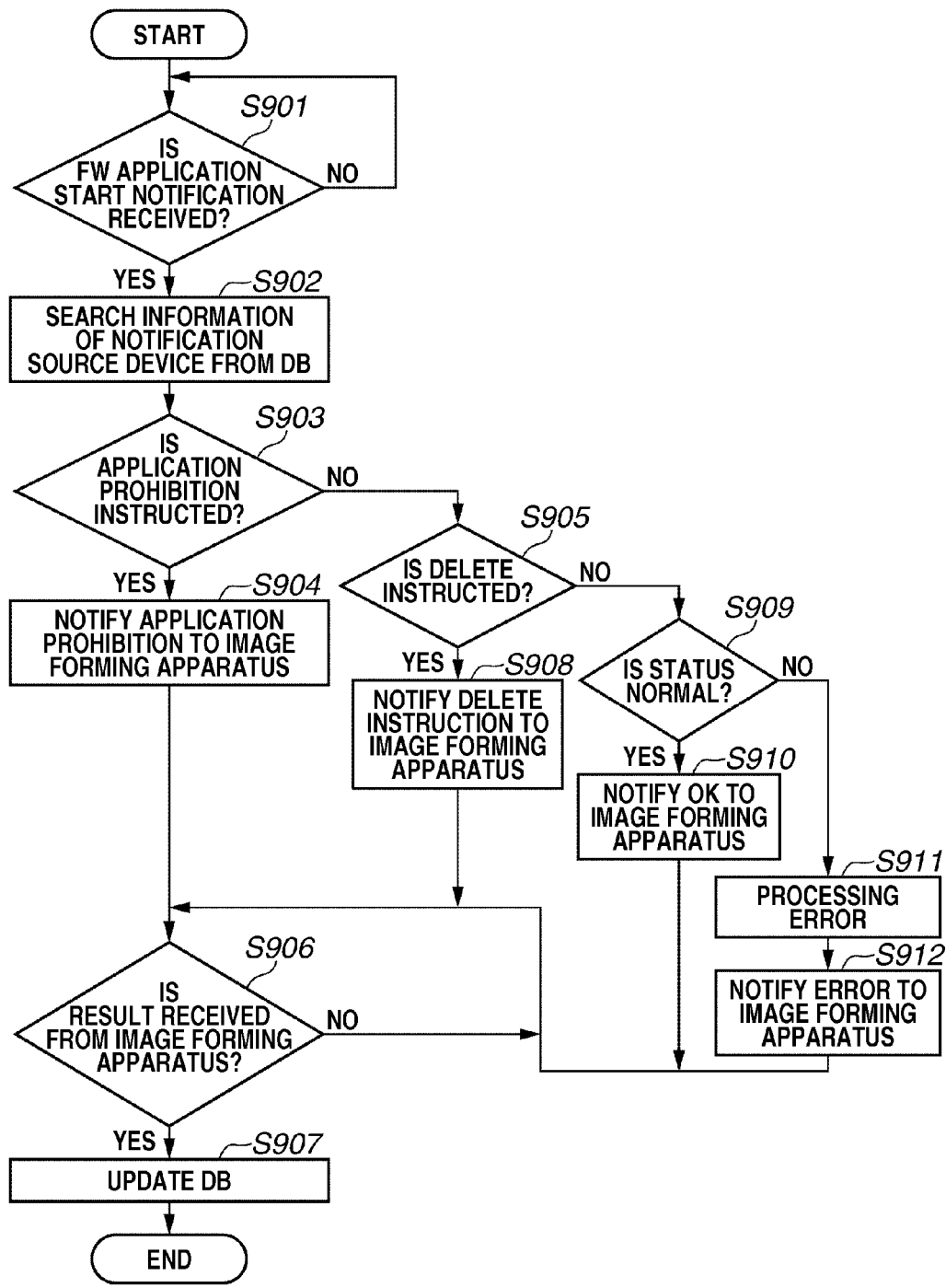
FIG. 12 is a flow chart illustrating an example of detailed processing performed in the distribution server during a period from a reception of a firmware (FW) application start notification to a database (DB) updating request.

FIG. 12 is a flow chart illustrating an example of detailed processing performed during a period from the reception of the FW application start notification (in step S604) to the DB updating request (in step S609) in the distribution server 101. The processing of each step in the present flow chart is performed by the monitoring control unit 401 of the distribution server 101, unless otherwise noted. More specifically, the processing of each step in the present flowchart is realized by the CPU 201 of the distribution server 101 reading out a program (i.e., program for realizing a function of the monitoring control unit 401) stored in the HDD 204 into the RAM 203 and executing the program.

In step S901, the monitoring control unit 401 of the distribution server 101 performs control that the monitoring control unit 401 can receive the firmware application start notification from the image forming apparatus 107 via the communication unit 405.

In a case where the monitoring control unit 401 of the distribution server 101 receives the firmware application start notification (YES in step S901), in step S902, the monitoring control unit 401 of the distribution server 101 requests for a search of the database 104 to the monitoring server 103 based on the device identifier of the image forming apparatus 107 included in the received firmware application start notification.

According to the specific contents of the search in step S902, such a value of the status 1702 of the record is detected from the image forming apparatus information 1700 that the device identifier of the image forming apparatus 107 included in the firmware application start notification matches the device identifier 1701. Based on the value of the status 1702, whether "application prohibition" or "delete instruction" is designated to the image forming apparatus 107 that is the application start notifying source can be confirmed.

In the present exemplary embodiment, the distribution server 101 receives the application start notification including the device identifier from the image forming apparatus 107. The application start notification may include other information in addition to the device identifier. Further, the distribution server 101 may confirm whether the status of the image forming apparatus 107 is normal when each information contained in the application start notification is referred to the information in the database 102.

When the monitoring control unit 401 of the distribution server 101 receives the retrieval result of step S902 from the monitoring server 103, insteps S903 through S912, the monitoring control unit 401 of the distribution server 101 makes a reply (i.e., first reply) based on the retrieval result. A detailed description of processing of each of the above described steps is described below.

In step S903, the monitoring control unit 401 of the distribution server 101 determines whether the "application prohibition" is instructed to the image forming apparatus 107 that is the application start notifying source based on the retrieval result. More specifically, the monitoring control unit 401 of the distribution server 101 determines whether the value of the status 1702 as the retrieval result is "application prohibited".

In a case where the monitoring control unit 401 of the distribution server 101 determines that the "application prohibition" is instructed to the image forming apparatus 107 that is the application start notifying source (YES in step S903), i.e., in a case where the value of the status 1702 is "application prohibited", the processing proceeds to step S904. In step S904, the monitoring control unit 401 of the distribution server 101 sends "application prohibition", as a reply to the application start notification, to the image forming apparatus 107 that is the application start notifying source. Then, the processing proceeds to step S906.

On the other hand, in a case where the monitoring control unit 401 of the distribution server 101 determines that "application prohibition" is not instructed to the image forming apparatus 107 that is the application start notifying source (NO in step S903), i.e., in a case where the value of the status 1702 is not "application prohibited", the processing proceeds to step S905.

In step S905, the monitoring control unit 401 of the distribution server 101 determines whether "delete" is instructed to the image forming apparatus 107 that is the application start notifying source based on the retrieval result of step S902. In other words, the monitoring control unit 401 of the distribution server 101 determines whether the value of the status 1702 as the retrieval result is "deletion reserved".

In a case where the monitoring control unit 401 of the distribution server 101 determines that "delete" is instructed to the image forming apparatus 107 that is the application start notifying source (YES in step S905), i.e., in a case where the value of the status 1702 is "deletion reserved", the processing proceeds to step S908. In step S908, the monitoring control unit 401 of the distribution server 101 sends "delete instruction", as a reply to the application start notification, to the image forming apparatus 107 that is the application start notifying source. Then, the processing proceeds to step S906.

On the other hand, in a case where the monitoring control unit 401 of the distribution server 101 determines that "delete instruction" is not instructed to the image forming apparatus 107 that is the application start notifying source (NO in step S905), i.e., in a case where the value of the status 1702 is not "deletion reserved", the processing proceeds to step S909.

In step S909, the monitoring control unit 401 of the distribution server 101 determines whether the status of the image forming apparatus 107 that is the application start notifying source is "normal" based on the retrieval result of step S902. In other words, the monitoring control unit 401 of the distribution server 101 determines whether the value of the status 1702 as the retrieval result is "normal".

In a case where the monitoring control unit 401 of the distribution server 101 determines that the status of the image forming apparatus 107 that is the application start notifying source is "normal" (YES in step S909), i.e., in a case where the value of the status 1702 is "normal", the processing proceeds to step S910. In step S910, the monitoring control unit 401 of the distribution server 101 sends "OK", as a reply to the application start notification, to the image forming apparatus 107 that is the application start-notifying source. Then, the processing proceeds to step S906.

On the other hand, in a case where the monitoring control unit 401 of the distribution server 101 determines that the status of the image forming apparatus 107 that is the application start notifying source is not "normal" (NO in step S909), i.e., in a case where the value of the status 1702 is not "normal", the processing proceeds to step S911. In step S911, the monitoring control unit 401 of the distribution server 101 decides that an error occurs and thus performs error processing according to a type of the error. In step S912, the monitoring control unit 401 of the distribution server 101 sends "NG", as a reply to the application start notification, to the image forming apparatus 107 that is the application start-notifying source. Then, the processing proceeds to step S906.

In step S906, the monitoring control unit 401 of the distribution server 101 waits to receive a notification of the result from the image forming apparatus 107 that is the application start notifying source. In a case where the monitoring control unit 401 of the distribution server 101 receives the result (YES in step S906), in step S907, the monitoring control unit 401 of the distribution server 101 updates the database 102 via the database access unit 406 and ends the processing of the present flow chart.

An example for updating the database 102 performed in step S907 is described below in detail. In a case where the result received from the image forming apparatus 107 in step S906 is "application completion notification", the monitoring control unit 401 of the distribution server 101 changes the value of the status 1605 of the record in the corresponding device identifier 1601 in the delivery information 1600 from "downloaded" to "complete". Further, the monitoring control unit 401 of the distribution server 101 makes a database updating request for updating the status 1702, the FW type 1703, and the FW version 1704 of the record of the corresponding device identifier 1701 in the image forming apparatus information 1700, to the monitoring server 103. As the contents of the update, the status 1702 is updated to "normal" and the FW type 1703 and the FW version 1704 are updated to the value of the FW type 1603 and the value of the FW version 1604 of the corresponding record in the delivery information 1600, respectively. Ina case where the requested updating of the database ends in success, the monitoring control unit 401 of the distribution server 101 changes the value of the result 1606 of the corresponding record in the delivery information 1600 to "OK". In a case where the requested database updating ends in failure, the monitoring control unit 401 of the distribution server 101 changes the value of the result 1606 to "NG".

In a case where the result received from the image forming apparatus 107 in step S906 is "delete completion notification" (YES in step S906), in step S907, the monitoring control unit 401 of the distribution server 101 changes the value of the status 1605 of the corresponding record in the delivery information 1600 to "cancel". In addition, the monitoring control unit 401 of the distribution server 101 makes a database updating request, to the monitoring server 103, in which the status 1702 of the record of the corresponding device identifier 1701 in the image forming apparatus information 1700 is changed to "cancel". The monitoring control unit 401 of the distribution server 101 changes the value of the result 1606 of the corresponding record in the delivery information 1600 to "OK" in a case where the requested database updating ends in success. On the other hand, the monitoring control unit 401 of the distribution server 101 changes the value of the result 1606 of the corresponding record in the delivery information 1600 to "NG" in a case where the requested database updating ends in failure. In a case where the result received from the image forming apparatus 107 is "completion notification accompanying application prohibition" (YES in step S906), the monitoring control unit 401 of the distribution server 101 does not perform the updating of the database 102.

Figure 13:
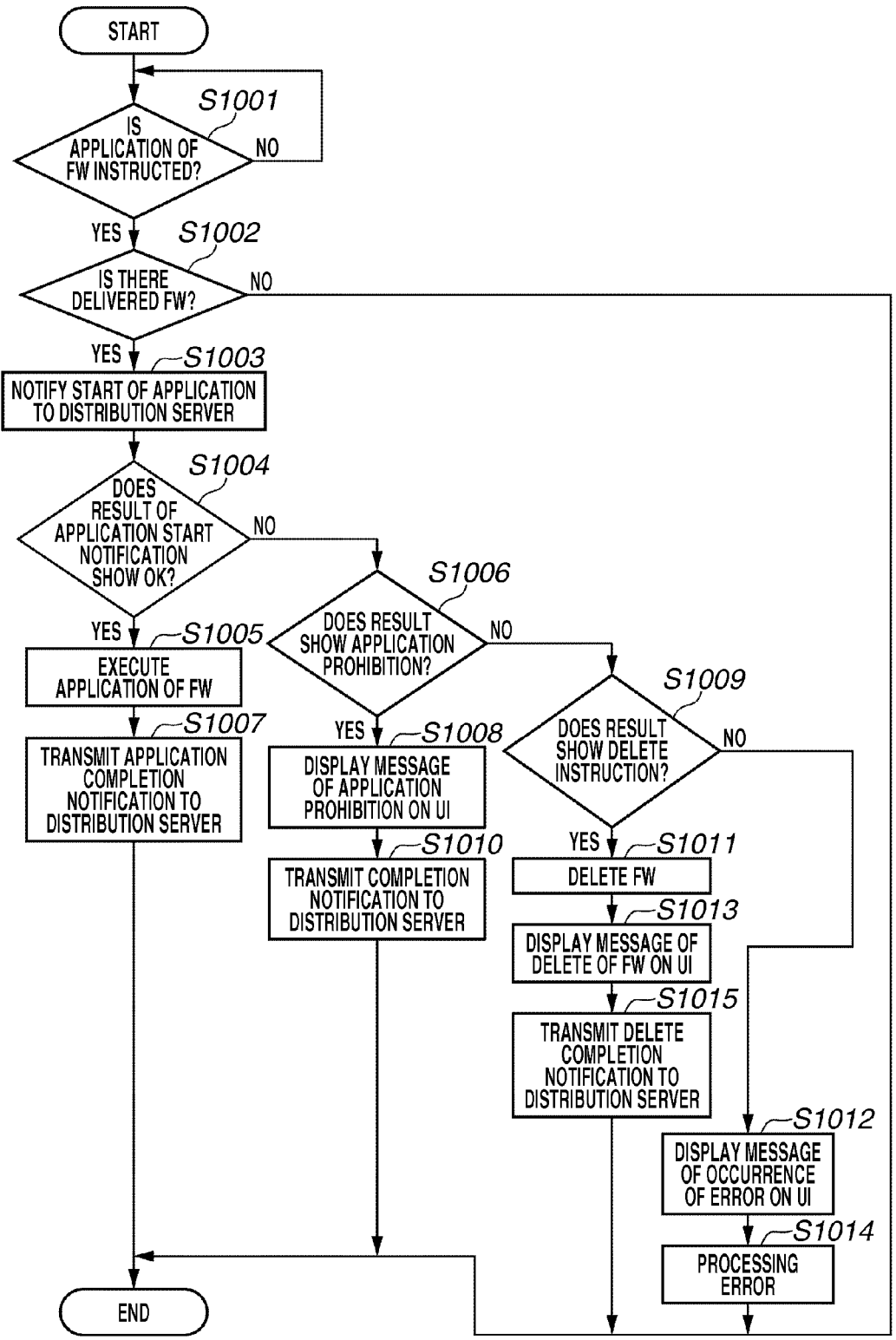
FIG. 13 is a flow chart illustrating an example of detailed processing performed in the image forming apparatus during a period from a FW application start instruction to a result notification.

FIG. 13 is a flow chart illustrating an example of detailed processing performed during a period from the FW application start instruction (in step S604) to the result notification (in step S608) in the image forming apparatus 107. Processing performed in each step of the flowchart is performed by the update control unit 502 of the image forming apparatus 107, unless otherwise noted. More specifically, the processing of each step of the flow chart is realized by the CPU 301 of the image forming apparatus 107 reading out a program (i.e., program for realizing a function of the update control unit 502) stored in the ROM 302 or the HDD 304 into the RAM 303 and executing the program. It is assumed that the firmware after downloaded from the distribution server 101 and before applied is preliminarily held (i.e., stored) in the HDD 304 of the image forming apparatus 107.

In step S1001, the UI unit 505 of the image forming apparatus 107 performs control that the instruction for applying the firmware received from the administrator of the image forming apparatus 107 can be accepted through the operation unit 305 of the image forming apparatus 107.

Figure 14:
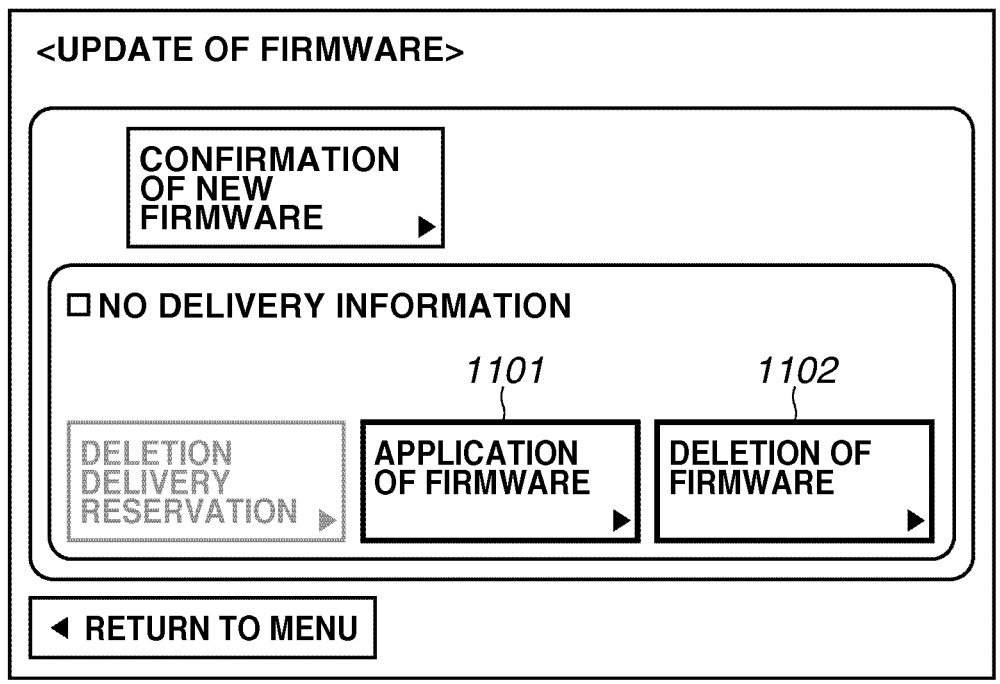
FIG. 14 illustrates an example of the UI (screen) displayed on the display unit by a UI unit in step S1001 of FIG. 13.

FIG. 14 illustrates an example of a UI (screen) to be displayed on the display unit 306 by the UI unit 505 in step S1001 of FIG. 13. In the UI of FIG. 14, the "firmware application" button 1101 receives the instruction for applying the delivered firmware and the "firmware delete" button 1102 receives the instruction for deleting the delivered firmware.

In a case where there is no downloaded firmware, the UI unit 505 controls the displayed screen such that the "firmware application" button 1101 and the "firmware delete" button 1102 cannot be pressed.

In a case where the UI unit 505 receives the "delivered firmware application instruction" as a result of pressing the "firmware application" button 1101 (YES in step S1001), the update control unit 502 performs processing of step S1002.

In step S1002, the update control unit 502 confirms whether there is delivered firmware in the HDD 304 of the image forming apparatus 107. In a case where the update control unit 502 determines that there is no delivered firmware in the HDD 304 of the image forming apparatus 107 (NO in step S1002), the update control unit 502 decides that an error occurs and thus ends the processing of the present flow chart without any change.

On the other hand, in a case where the update control unit 502 determines that there is the delivered firmware in the HDD 304 of the image forming apparatus 107 (YES in step S1002), in step S1003, the update control unit 502 transmits the firmware application start notification to the distribution server 101 via the communication unit 504 of the image forming apparatus 107.

The firmware application start-notification includes the device identifier of the image forming apparatus 107 that is the notification source. In the present exemplary embodiment, the device identifier is included in the firmware application start notification but the types, the versions, and the like of the firmware to be applied may also be included in the firmware application start notification in addition to the device identifier. The update control unit 502 can determine whether the firmware to be applied is the correct one by confirming if the information coincides with the information of the delivered firmware held by the distribution server 101.

In a case where the update control unit 502 receives a response of the firmware application start-notification from the distribution server 101, the processing proceeds to step S1004. In step S1004, the update control unit 502 determines whether the response result of the firmware application start notification is "OK" (i.e., application approval). In a case where the update control unit 502 determines that the response result of the firmware application start notification is "OK" (YES in step S1004), the processing proceeds to step S1005. In step S1005, the update control unit 502 performs the application processing (i.e., first application) of the delivered firmware within the HDD 304 of the image forming apparatus 107. More specifically, the update control unit 502 stores the delivered firmware in the firmware storage region of a flush ROM in the ROM 302 or the HDD 304 to reboot the image forming apparatus 107, thereby booting-up the image forming apparatus 107 by the firmware. In step S1007, the update control unit 502 transmits the application result (e.g., "application completion notification" in a case where the processing normally ends) of the firmware to the distribution server 101 and ends the processing of the present flow chart.

On the other hand, in a case where the update control unit 502 determines that the response result of the firmware application start notification is not "OK" (No in step S1004), the processing proceeds to step S1006. In step S1006, the update control unit 502 determines whether the response result of the firmware application start notification is "application prohibition". In a case where the update control unit 502 determines that the response result of the firmware application start notification is "application prohibition" (YES in step S1006), the processing proceeds to step S1008.

In step S1008, the update control unit 502 displays a message indicating that application of the firmware is prohibited (FIG. 15) on the display unit 306 by using the UI unit 505. In step S1010, the update control unit 502 subsequently transmits the firmware delete completion notification to the distribution server 101. Then, the processing of the present flow chart is ended.

Figure 15:
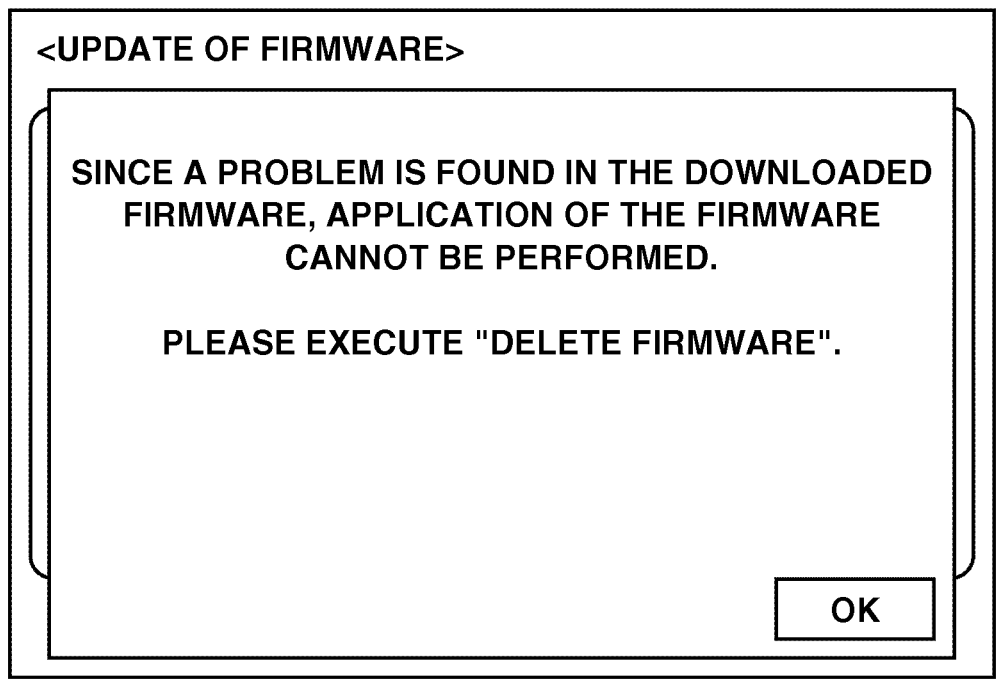
FIG. 15 illustrates an example of the UI (screen) displayed on the display unit by the UI unit in step S1008 of FIG. 13.

FIG. 15 illustrates an example of the UI (screen) displayed on the display unit 306 by the UI unit 505 in step S1008 of FIG. 13. In the UI of FIG. 15, a message merely indicating that the firmware includes a problem is displayed; however, a message indicating detailed information of the problem may be displayed. In the image forming apparatus 107 including a user management system, the firmware of which application is prohibited may be applied depending on an authority of a log-in user.

Hereinafter, description returns to the flow chart of FIG. 13. On the other hand, in a case where the update control unit 502 determines that the response result of the firmware application start notification is not "application prohibition" (NO in step S1006), the processing proceeds to step S1009. In step S1009, the update control unit 502 determines whether the response result of the firmware application start notification is "delete instruction". In a case where the update control unit 502 determines that the response result of the firmware application start notification is "delete instruction" (YES in step S1009), the processing proceeds to step S1011.

In step S1011, the update control unit 502 deletes the delivered firmware stored in the HDD 304 of the image forming apparatus 107. In step S1013, the update control unit 502 displays a message indicating that the firmware is deleted by using the UI unit 505 on the display unit 306. In step S1015, the update control unit 502 transmits the firmware delete completion notification to the distribution server 101 and ends the processing of the present flow chart.

On the other hand, in a case where the update control unit 502 determines that the response result of the firmware application start notification is not "delete instruction" (NO in step S1009), the processing proceeds to step S1012. In step S1012, the update control unit 502 displays, considering that some error occurs, a message indicating that some error occurs on the display unit 306 by using the UI unit 505. In step S1014, the update control unit 502 performs error processing according to a type of the error and ends the processing of the present flow chart.

As described above, according to the present exemplary embodiment, in a case where the delivered firmware includes a problem, the application of the delivered firmware to the image forming apparatus can be limited (prohibited) from a delivery side.

Although it is not illustrated in the flow chart, in a case where the UI unit 505 receives the "delivered firmware delete instruction" according to a press of the "firmware delete" button 1102, the update control unit 502 deletes the delivered firmware stored in the HDD 304 of the image forming apparatus 107. The update control unit 502 displays a message indicating that the firmware is deleted by using the UI unit 505 on the display unit 306 and transmits a firmware delete completion notification (including the device identifier thereof) to the distribution server 101. When the monitoring control unit 401 of the distribution server 101 receives the "delete completion notification" from the image forming apparatus 107, the monitoring control unit 401 of the distribution server 101 changes the value of the status 1605 of the corresponding record in the delivery information 1600 to "cancel". Further, the monitoring control unit 401 of the distribution server 101 makes the database updating request to the monitoring server 103 to change the status 1702 of the record of the corresponding device identifier 1701 in the image forming apparatus information 1700 to "normal". In a case where the requested database updating ends in success, the monitoring control unit 401 of the distribution server 101 changes the value of the result 1606 of the corresponding record in the delivery information 1600 to "OK". To the contrary, in a case where requested database updating ends in failure, the monitoring control unit 401 of the distribution server 101 changes the value of the result 1606 to "NG".

A method for automatically deleting the firmware within a plurality of image forming apparatus 107 is described below with reference to FIGS. 16A and 17A in a case where there is the plurality of image forming apparatus 107 in which the firmware including a problem is found and left as it is delivered.

Processing performed at a client side (i.e., at a side of the image forming apparatus 107) is described below with reference to FIG. 16A. FIG. 16A is a flow chart illustrating an example of detailed processing relating to deletion of the firmware in the image forming apparatus 107 in the first exemplary embodiment. Processing of each step of the flowchart is performed by the monitoring agent unit 501 of the image forming apparatus 107, unless otherwise noted. More specifically, the processing of each step of the flow chart is realized by the CPU 301 of the image forming apparatus 107 reading out a program (i.e., a program for realizing a function of the update control unit 502) stored in the ROM 302 or the HDD 304 and executing the program.

The monitoring agent unit 501 periodically makes a firmware delete reservation confirmation (i.e., delete confirmation (first confirmation)) with respect to the monitoring server 103 according to a schedule set in the monitoring agent unit 501 that is used when transmitting an information notification to the above described monitoring server 103. In a case where time for making a periodical confirmation to the monitoring server 103 comes (YES in step S1301), the monitoring agent unit 501 transmits a firmware delete reservation confirmation request including the device identifier of its own to the monitoring server 103. The monitoring agent unit 501 subsequently waits until it receives a response to the firmware delete reservation confirmation request. After the monitoring agent unit 501 receives the response to the firmware delete reservation confirmation request from the monitoring server 103, the processing proceeds to step S1302.

In step S1302, the monitoring agent unit 501 determines whether there is a delete reservation based on the response result. More specifically, the monitoring agent unit 501 determines whether the response is "delete reservation exists". In a case where the monitoring agent unit 501 determines that there is no delete reservation (NO in step S1302), i.e., in a case where the response result is not "delete reservation exists", the processing returns to step S1301 where the monitoring agent unit 501 makes the firmware delete reservation confirmation according to the schedule again.

On the other hand, in a case where the monitoring agent unit 501 determines that there is the delete reservation (YES in step S1302), i.e., in a case where the response result is "delete reservation exists", the monitoring agent unit 501 instructs the update control unit 502 to delete the firmware.

In step S1303, the update control unit 502 after receiving the firmware delete instruction makes a confirmation whether there is a delivered firmware in the HDD 304. In a case where the update control unit 502 determines that there is the delivered firmware in the HDD 304 (YES in step S1303), in step S1304, the update control unit 502 deletes the delivered firmware in the HDD 304.

In step S1306, the update control unit 502 subsequently transmits "firmware delete completion report" to the distribution server 101 and thereafter notifies a completion of the deletion of the firmware to the monitoring agent unit 501 (i.e., delete completion report).

In step S1308, the monitoring agent unit 501 after receiving the deletion completion report transmits "delete completion notification" to the monitoring server 103 and ends the processing of the present flow chart. On the other hand, in step S1302, in a case where the update control unit 502 determines that there is no delivered firmware in the HDD 304 (NO in step S1303), the processing proceeds to step S1305.

In step S1305, the update control unit 502 reports occurrence of the error to the monitoring agent unit 501 after performing necessary processing for fixing the error. In step S1307, the monitoring agent unit 501 after receiving the error report transmits an error notification to the monitoring server 103 and ends the processing of the present flow chart.

Processing performed at a server side is described below with reference to FIG. 17A. FIG. 17A is a flow chart illustrating an example of detailed processing performed in the monitoring server 103 of the first exemplary embodiment. Processing of each step of the flow chart is performed by the monitoring control unit 401 of the monitoring server 103, unless otherwise noted. More specifically, the processing of each step of the flow chart is realized by the CPU 201 of the monitoring server 103 reading out a program (i.e., program for realizing a function of the monitoring control unit 401) stored in the HDD 204 into the RAM 203 and executing the program.

In step S1401, the monitoring control unit 401 of the monitoring server 103 performs control that the firmware delete reservation confirmation request (i.e., delete confirmation) transmitted from the image forming apparatus 107 via the communication unit 405 can be received.

In a case where the monitoring control unit 401 of the monitoring server 103 receives a firmware delete reservation confirmation request (YES in step S1401), the processing proceeds to step S1402. In step S1402, the monitoring control unit 401 of the monitoring server 103 searches a value of the status 1702 of the record of the device identifier 1701 that coincides with a device identifier contained in the firmware delete reservation confirmation request, from the image forming apparatus information 1700 in the database 104.

The monitoring control unit 401 of the monitoring server 103 makes a reply (i.e., second replay) based on the retrieval result of step S1402, in steps S1403 through S1407. The second replay is described below in detail. In step S1403, the monitoring control unit 401 of the monitoring server 103 determines whether the status 1702 is "deletion reserved" based on the retrieval result of step S1402. In a case where the monitoring control unit 401 of the monitoring server 103 determines that the status 1702 is "deletion reserved" (YES in step S1403), the processing proceeds to step S1404. In step S1404, the monitoring control unit 401 of the monitoring server 103 replies "delete reservation exists" to the image forming apparatus 107 and, in step S1405, waits until it receives the result from the image forming apparatus 107 via the communication unit 405.

In a case where the monitoring control unit 401 of the monitoring server 103 receives the result from the image forming apparatus 107 (YES in step S1405), in step S1406, the monitoring control unit 401 of the monitoring server 103 updates the database 104 and ends the processing of the present flow chart.

A detailed example of updating of the database 104 in step S1406 is described below. In a case where the result received from the image forming apparatus 107 is "delete completion notification", the monitoring control unit 401 of the monitoring server 103 changes the value of the status 1702 of the corresponding device identifier 1701 in the image forming apparatus information 1700 to "normal" by using the database access unit 406. Further, the monitoring control unit 401 of the monitoring server 103 makes a database updating request to change the value of the status 1605 of the record of the corresponding device identifier 1601 in the delivery information 1600 to "cancel" and the value of the result 1606 to "OK". In a case where the result received from the image forming apparatus 107 is "error", the monitoring control unit 401 of the monitoring server 103 updates the database 104 according to the contents of the error.

On the other hand, in step S1403, in a case where the monitoring control unit 401 of the monitoring server 103 determines that the status 1702 is not "deletion reserved" based on the retrieval result of step S1402 (No in step S1403), in step S1407, the monitoring control unit 401 of the monitoring server 103 sends "delete reservation does not exist" in reply to the image forming apparatus 107 and ends the processing of the present flow chart.

In FIG. 16A, the processing performed in a single image forming apparatus 107 is described; however, the processing is independently performed in each individual image forming apparatus 107. In FIG. 17A, the processing of the monitoring server 103 with respect to the single image forming apparatus 107 is described; however, the processing can be performed in parallel on the plurality of image forming apparatus 107 within the monitoring server 103.

As described above, according to the present exemplary embodiment, even in a case where there is the plurality of image forming apparatus 107 in which the firmware including a problem is found and remains as delivered in the image forming apparatus, the firmware can be automatically deleted without bothering the administrator.

According to the present exemplary embodiment, in a case where the delivery administrator instructs "application prohibition" of the firmware, application of the firmware is prohibited according to the instruction and is not deleted. However, the application of the firmware may be prohibited according to the instruction and deleted in a case where the delivery administrator instructs "application prohibition" of the firmware.

In a second exemplary embodiment, in a case where the firmware having a problem is already applied to the image forming apparatus 107, an example in which a rollback of the firmware of the image forming apparatus 107 is automatically performed, is described below with reference to FIGS. 10B, 11B, 16B, and 17B.

FIG. 10B is a flow chart illustrating an example of detailed processing relating to the rollback performed in the distribution server 101 of the second exemplary embodiment. Processing of each step of the flow chart is performed by the monitoring control unit 401 of the distribution server 101, unless otherwise noted. More specifically, the processing of each step of the flow chart is realized by the CPU 201 of the distribution server 101 reading out a program (i.e., program for realizing a function of the monitoring control unit 401) stored in the HDD 204 into the RAM 203 and executing the program.

The monitoring control unit 401 of the distribution server 101 receives a request for a display of a list of the image forming apparatus 107 to which a specific release stop firmware is applied by the delivery administrator via the communication unit 405 of the distribution server 101. This request is transmitted from the Web browser of the PC 111.

In a case where the monitoring control unit 401 of the distribution server 101 receives the list display request (YES in step S2701), in step S2702, the monitoring control unit 401 of the distribution server 101 performs a search (i.e., second detection) of the corresponding image forming apparatus 107 based on the firmware information 1500 and the delivery information 1600 in the database 102 by using the database access unit 406 of the distribution server 101. In other words, the monitoring control unit 401 of the distribution server 101 acquires the values of the FW type 1501 and the FW version 1503 of the record in which a value of the status 1502 of the firmware information 1500 is "release stop" or "delete". Further, the monitoring control unit 401 of the distribution server 101 searches the delivery information 1600 for the device identifier 1601 (i.e., the corresponding image forming apparatus) in which the delivery FW 1603 and the FW version 1604 coincide with the FW type 1501 and the FW version 1503 of the above acquired release stop and the status 1605 is "complete".

In a case where the value of the status 1502 of the firmware information 1500 of anyone of the firmware is changed to "release stop" or "delete" according to the instruction from the Web browser of the PC 111, the monitoring control unit 401 of the distribution server 101 may start processing on and after step S2702 considering that the monitoring control unit 401 received from the delivery administrator of step S2701 the request for the display of the list of the image forming apparatus 107 to which a specific release stop firmware is applied.

The monitoring control unit 401 of the distribution server 101 subsequently determines whether there is the corresponding device identifier 1601 (i.e., corresponding image forming apparatus) based on the retrieval result of step S2702. In a case where the monitoring control unit 401 of the distribution server 101 determines that there is the corresponding device identifier 1601 (i.e., corresponding image forming apparatus) based on the retrieval result (YES in step S2703), in step S2704, the monitoring control unit 401 of the distribution server 101 transmits a list (FIG. 11B) of the image forming apparatus corresponding to the device identifier 1601 to the Web browser of the PC 111. The Web browser of the PC 111 displays the list (FIG. 11B) of the image forming apparatus. In step S2705, the monitoring control unit 401 of the distribution server 101 waits for the instruction (i.e., second instruction) from FIG. 11B to be transmitted via the Web browser of the PC 111.

Figure 11B:
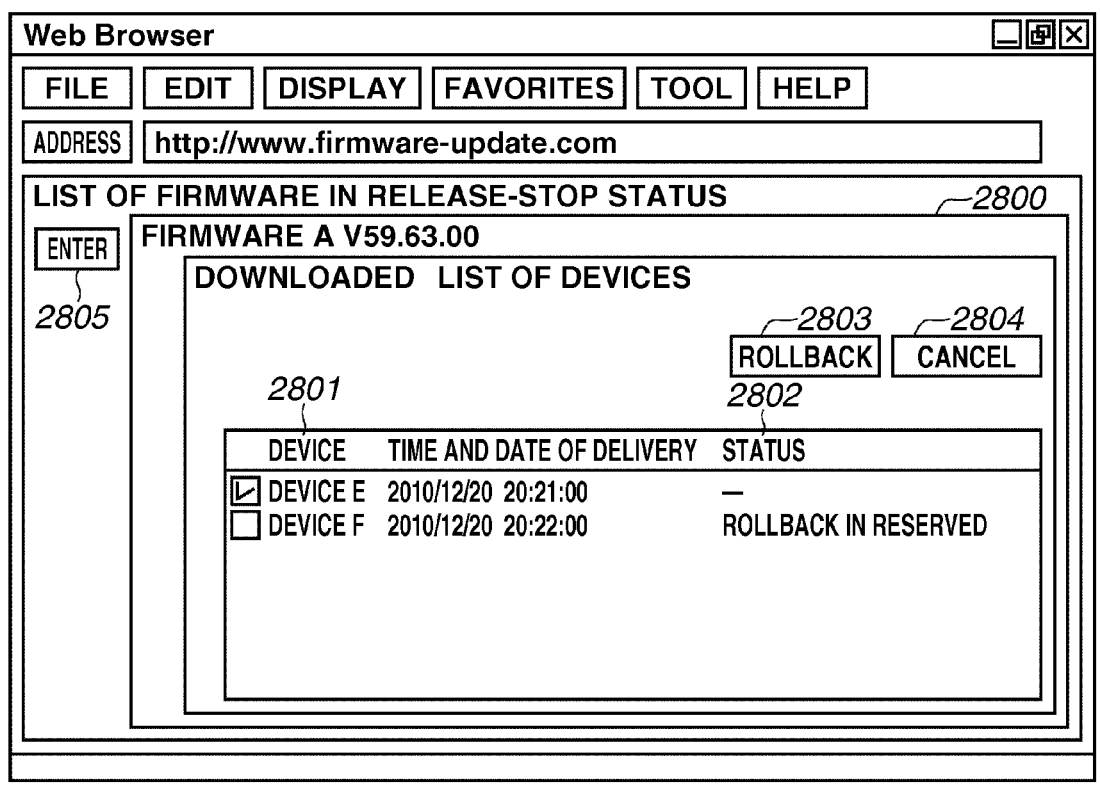

FIG. 11B illustrates an example of a UI (screen) to be displayed on the display unit 205 of the Web browser of the PC 111 in step S2704 of FIG. 10B. In the UI of FIG. 11B, an applied device list screen 2800 is displayed for each release stop firmware. In each screen 2800, a single or a plurality of image forming apparatus can be selected from the list 2801 of the image forming apparatus. The rollback of the firmware is designated by pressing a rollback button 2803 with respect to the selected image forming apparatus. Thus, a reservation of the rollback can be made, by which the firmware of the version just preceding the firmware of a presently applied version, is applied to the image forming apparatus 2801. In addition, by pressing a "cancel" button 2804 after selecting the image forming apparatus showing status 2802 of "rollback reserved", the designation of the reservation of the rollback of the firmware can be cancelled. In the screen of FIG. 11B, when the "rollback" button 2803 or the "cancel" button 2804 is indicated according to a program or the like installed in the screen, control is performed to display contents according to the indication on the status display column 2802.

A press of an "enter" button 2805 enables a transmission of an identifier 2801, a status thereof 2802, and the like of the image forming apparatus displayed in each screen 2800 from the Web browser of the PC 111 to the distribution server 101.

Hereinafter, the description returns to the flow chart of FIG. 10B. In a case where the monitoring control unit 401 of the distribution server 101 determines that the rollback is designated on the UI of FIG. 11B (YES in step S2705), in step S2706, the monitoring control unit 401 of the distribution server 101 performs the DB updating processing and ends the processing of the present flow chart.

The updated details resulting from the DB updating processing of step S2706 are described below. The monitoring control unit 401 of the distribution server 101 creates a new record in the delivery information 1600. At the time, the monitoring control unit 401 of the distribution server 101 sets the device identifier of the image forming apparatus 107 to the device identifier 1601 in the new record. And, the monitoring control unit 401 sets the delivery FW and the FW version in the record, in which the status 1605 is "complete" and the result 1606 is "OK", of the corresponding image forming apparatus 107 (i.e., record that was applied two applications ago) to the delivery FW 1603 and the FW version 1604 in the new record. And, the monitoring control unit 401 sets "in delivery" to the status 1605 in the new record.

Further, the monitoring control unit 401 of the distribution server 101 requests the monitoring server 103 to update the status 1702, delivery reserved FW type 1705, and the delivery reserved FW version 1706 of the record of the image forming apparatus information 1700 of the corresponding image forming apparatus 107. The status 1702 is designated as "delivery reserved".

The delivery FW 1603 and the FW version 1604 of the record in which the image forming apparatus 107 of the corresponding device identifier 1601 in the delivery information 1600 (i.e., record that was applied two applications ago) are designated as the delivery reserved FW type 1705 and the delivery scheduled FW version 1706, respectively. Further, "automatic application" is designated to the automatic application information (information (not illustrated) contained in the image forming apparatus information 1700 whether the firmware to be delivered is automatically applied among information). It is because in a case of the rollback, the firmware presently applied includes a problem and thus the firmware to be delivered needs to be applied as rapidly as possible.

Although it is not illustrated in FIG. 10B, in a case where there is no reply from the Web browser of the PC 111 that displays the UI, for a predetermined time, the processing of the present flow chart is ended as is.

In step S2703, in a case where the monitoring control unit 401 of the distribution server 101 determines that there is no corresponding device identifier 1601 (i.e., corresponding image forming apparatus) based on the retrieved result of step S2702 (NO in step S2703), in step S2708, the monitoring control unit 401 of the distribution server 101 displays the message to that effect on the UI. Then, the processing returns to step S2701.

FIG. 10B illustrates a configuration for causing the user to select the image forming apparatus in which the rollback is performed with respect to the applied firmware, by displaying the UI of FIG. 11B. However, the monitoring control unit 401 of the distribution server 101 may search the corresponding image forming apparatus from the DB in step S2702 and, without displaying the UI of FIG. 11B, perform the processing for updating the DB in step S2706 assuming that "rollback" is instructed to all of the searched corresponding image forming apparatus.

Figure 16B:
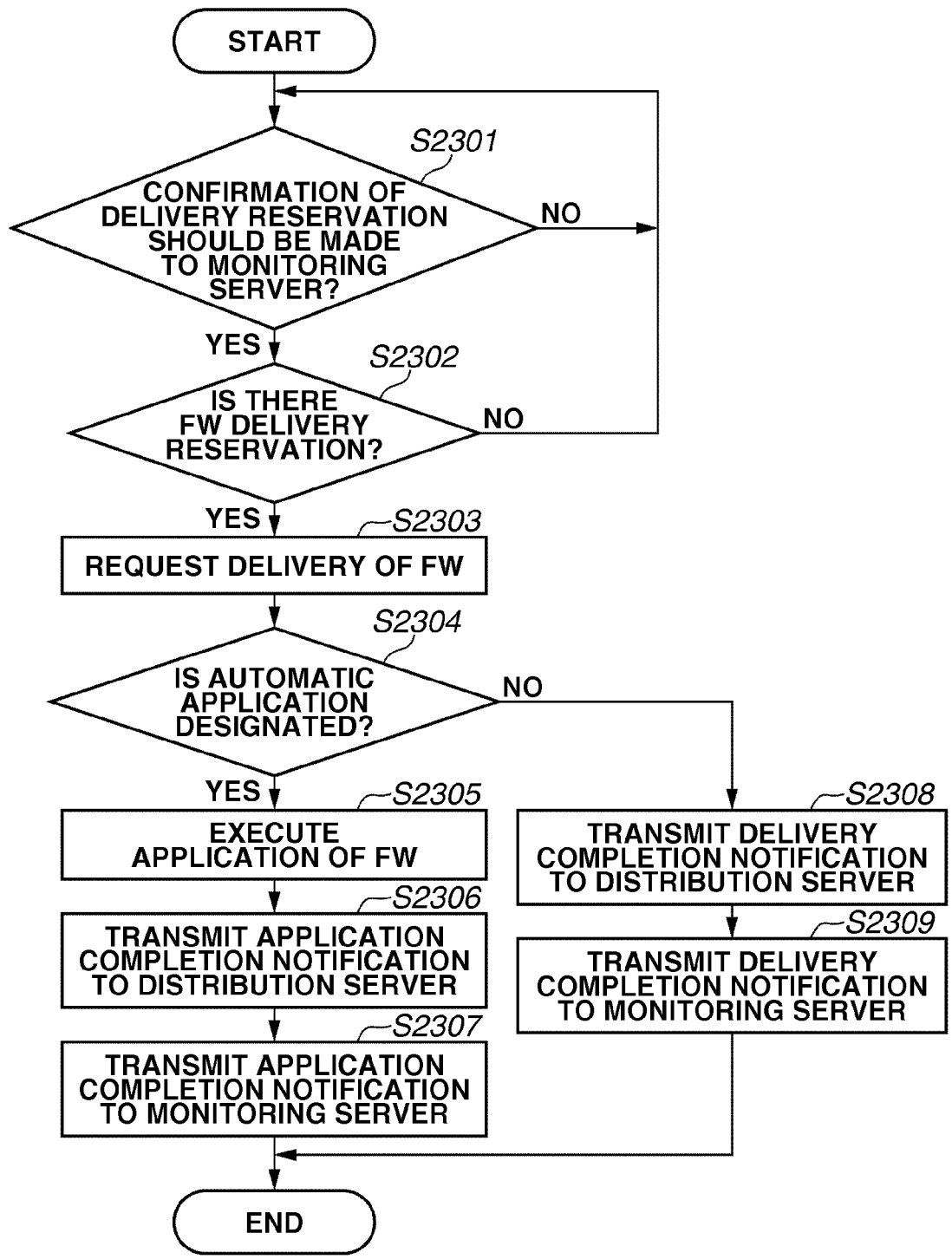

A method for actually performing the rollback of the applied firmware in which a problem is found is described below with reference to FIGS. 16B and 17B. Processing performed at the client side (i.e., a side of the image forming apparatus 107) is described below with reference to FIG. 16B. FIG. 16B is a flow chart illustrating an example of detailed processing relating to the rollback performed in the image forming apparatus 107 of the second exemplary embodiment. The processing of each step of the flow chart is performed by the monitoring agent unit 501 of the image forming apparatus 107, unless otherwise noted. More specifically, the processing of each step of the flow chart is realized by the CPU 301 of the image forming apparatus 107 reading out a program (i.e., program for realizing a function of the update control unit 502) stored in the ROM 302 or the HDD 304 into to the RAM 303 and executing the program.

The monitoring agent unit 501 periodically confirms a firmware delivery reservation to the monitoring server 103 according to a schedule stored in the monitoring agent unit 501 which is used in transmitting the information notification to the above described monitoring server 103. In a case where time for a periodical confirmation to the monitoring server 103 comes (YES in step S2301), the monitoring agent unit 501 transmits a request for the firmware delivery reservation confirmation (i.e., delivery confirmation (second confirmation)) containing the device identifier of its own, to the monitoring server 103. The monitoring agent unit 501, then, waits until it receives a response to the request for the firmware delivery reservation confirmation. In a case where the monitoring agent unit 501 receives the response to the request for the firmware delivery reservation confirmation from the monitoring server 103 (YES in step S2301), the processing proceeds to step S2302.

In step S2302, the monitoring agent unit 501 determines whether there is the delivery reservation based on the response result. More specifically, the monitoring agent unit 501 determines whether the response result is "delivery reservation exists". The response result includes values of the delivery scheduled FW 1705 and the delivery scheduled FW version 1706 and automatic application information (i.e., information (not illustrated) contained in the image forming apparatus information 1700 which indicates whether the firmware to be delivered is automatically applied).

In a case where the monitoring agent unit 501 determines there is no delivery reservation (NO in step S2302), i.e., in a case where the response result is not "delivery reservation exists", the processing returns to step S2301 where the firmware delivery reservation confirmation is made according to the schedule.

On the other hand, in a case where the monitoring agent unit 501 determines that there is the delivery reservation (YES in step S2302), i.e., in a case where the response result is "delivery reservation exists", the processing proceeds to step S2303. In step S2303, the monitoring agent unit 501 instructs the update control unit 502 to deliver the firmware, based on the above received delivery scheduled FW 1705 and the delivery scheduled FW version 1706. The update control unit 502 after receiving the firmware delivery instruction makes a request for delivery of the firmware corresponding to the delivery scheduled FW 1705 and the delivery scheduled FW version 1706 to the distribution server 101. The update control unit 502 subsequently receives the firmware delivered according to the delivery request and stores the received firmware in the HDD 304.

In step S2304, the update control unit 502 determines whether the above received automatic application information (i.e., information (not illustrated) contained in the image forming apparatus information 1700 which indicates whether the firmware to be delivered is automatically applied) indicates "automatic application". In a case where the update control unit 502 determines that the automatic application information indicates "automatic application" (YES in step S2304), in step S2305, the update control unit 502 performs processing for applying the delivered firmware (second application). In other words, the update control unit 502 stores the delivered firmware in the firmware storage region of the flush ROM in the ROM 302 or the HDD 304 and reboots the image forming apparatus 107 by the firmware.

After the reboot, in step S2306, the update control unit 502 transmits "application completion notification" to the distribution server 101 and notifies the completion of the application (i.e., application completion report) to the monitoring agent unit 501.

In step S2307, the monitoring agent unit 501 after receiving the application completion notification transmits "application completion notification" to the monitoring server 103 and ends the processing of the present flow chart. On the other hand, in a case where the update control unit 502 determines that the received automatic application information is not "automatic application" (i.e., "manual application") (No in step S2304), in step S2308, the update control unit 502 transmits "delivery completion notification" to the distribution server 101 and subsequently notifies the monitoring agent unit 501 that the delivery is completed (delivery completion report).

In step S2309, the monitoring agent unit 501 after receiving the delivery completion report transmits "delivery completion notification" to the monitoring server 103 and ends the processing of the present flow chart. Processing performed at the server side is described below with reference to FIG. 17B.

FIG. 17B is a flow chart illustrating an example of detailed processing performed in the monitoring server 103 of the second exemplary embodiment. The processing of each step of the flow chart is performed by the monitoring control unit 401 of the monitoring server 103, unless otherwise noted. More specifically, the processing of each step of the flow chart is realized by the CPU 201 of the monitoring server 103 reading out a program (i.e., program for realizing a function of the monitoring control unit 401) stored in the HDD 204 into the RAM 203 and executing the program.

In step S2401, the monitoring control unit 401 of the monitoring server 103 performs control that a request for the firmware delivery reservation confirmation (i.e., delivery confirmation) transmitted from the image forming apparatus 107 can be received via the communication unit 405.

In a case where the monitoring control unit 401 of the monitoring server 103 receives the request for the firmware delivery reservation confirmation (YES in step S2401), the processing proceeds to step S2402. In step S2402, the monitoring control unit 401 of the monitoring server 103 searches a value of the status 1702 of the record of the device identifier 1701 that coincides with the device identifier contained in the request for the firmware delete reservation confirmation, from the image forming apparatus information 1700 in the database 104.

The monitoring control unit 401 of the monitoring server 103 makes a reply (i.e., third replay) based on the retrieval result of step S2402 in steps S2403 through S2407. Detailed description thereof is made below. In step S2403, the monitoring control unit 401 of the monitoring server 103 determines presence or absence of the delivery reservation of the firmware (i.e., firmware to be delivered) by checking whether the status 1702 is "delivery reserved" based on the retrieval result of step S2402.

In a case where the monitoring control unit 401 of the monitoring server 103 determines that the status 1702 is "delivery reserved", the monitoring control unit 401 of the monitoring server 103 determines that there is the firmware (i.e., firmware to be delivered) delivery reservation (YES in step S2403). Then, the processing proceeds to step S2404.

In step S2404, the monitoring control unit 401 of the monitoring server 103 transmits "delivery reservation exists" in reply to the image forming apparatus 107 and, in step S2405, waits until it receives the result from the image forming apparatus 107 via the communication unit 405. The reply of "delivery reservation exists" includes the delivery scheduled FW 1705 and the delivery scheduled FW version 1706 of the corresponding record of the image forming apparatus information 1700, and automatic application information (i.e., information (not illustrated) contained in the image forming apparatus information 1700 which indicates whether the firmware to be delivered is automatically applied).

In a case where the monitoring control unit 401 of the monitoring server 103 receives the result from the image forming apparatus 107 (YES in step S2405), in step S2406, the monitoring control unit 401 of the monitoring server 103 updates the database 104 and ends the processing of the present flow chart.

A detailed example of updating of the database 104 in step S2406 is described below. In a case where the result received from the image forming apparatus 107 is "application completion notification", the monitoring control unit 401 of the monitoring server 103 changes the value of the status 1702 of the corresponding device identifier 1701 in the image forming apparatus information 1700, to "normal" by using the database access unit 406. Further, the monitoring control unit 401 of the monitoring server 103 changes the values of the FW type 1703 and the FW version 1704 to the values of the delivery scheduled FW 1705 and the delivery scheduled FW version 1706, respectively. Still further, the monitoring control unit 401 of the monitoring server 103 deletes the values of the delivery scheduled FW 1705 and the delivery scheduled FW version 1706.

In a case where the result received from the image forming apparatus 107 is "delivery completion notification", the monitoring control unit 401 of the monitoring server 103 changes the value of the status 1702 of the corresponding device identifier 1701 in the image forming apparatus information 1700, to "normal" by using the database access unit 406 and deletes the values of the delivery scheduled FW 1705 and the delivery scheduled FW version 1706.

On the other hand, in step S2403, in a case where the monitoring control unit 401 of the monitoring server 103 determines that the status 1702 is not "delivery reserved" based on the retrieval result of step S2402, the monitoring control unit 401 of the monitoring server 103 determines that there is no firmware (i.e., firmware to be delivered) delivery reservation (NO in step S2403). In step S2407, the monitoring control unit 401 of the monitoring server 103 thus transmits in reply "delivery reservation does not exist" to the image forming apparatus 107. Then, the processing of the present flow chart is ended.

In FIG. 16B, processing performed in a single image forming apparatus 107 is described; however, the processing is performed independently in each image forming apparatus 107. In FIG. 17B, processing of the monitoring server 103 with respect to a single image forming apparatus 107 is described; however, the processing can be performed in parallel on the plurality of image forming apparatus 107 within the monitoring server 103.

Although it is not illustrated, the monitoring control unit 401 of the distribution server 101 that receives the request (step S2303 of FIG. 16B) for delivering the firmware from the image forming apparatus 107 reads out the firmware that corresponds to the FW type and the FW version designated by the delivery request, from the HDD 204 and delivers the firmware to the image forming apparatus 107 that is the request source of the delivery.

In a case where the monitoring control unit 401 of the distribution server 101 receives the result from the image forming apparatus 107 that is a delivery source of the firmware, the monitoring control unit 401 of the distribution server 101 updates the database 102. A specific example for updating the database 102 is described below. In a case where the result received from the image forming apparatus 107 is "application completion notification", the monitoring control unit 401 of the distribution server 101 changes the value of the status 1605 of the record of the corresponding device identifier 1601 in the delivery information 1600 to "complete" and the value of the result 1606 to "OK".

In a case where the result received from the image forming apparatus 107 is "delivery completion notification", the monitoring control unit 401 of the distribution server 101 changes the value of the status 1605 of the record of the corresponding device identifier 1601 in the delivery information 1600 to "downloaded".

As described above, according to the present exemplary embodiment, in a case where there is the plurality of image forming apparatus 107 to which the firmware having a problem is applied, an automatic rollback of the firmware can be performed without bothering the administrator.

As its result, an administration cost of the administrator who manages the delivery of the firmware can be saved. The above described structures of various data and its contents are not limited to the above but, can be any structures and contents depending on use and purpose. Hereinabove, exemplary embodiments are described; however, the present invention can be realized by any embodiments such as a system, a device, a method, a program, or a storage medium. More specifically, the present invention may be applied to a system including a plurality of devices or applied to a singular device. The structures of any combinations of the above described exemplary embodiments fall under the scope of the present invention.

Other Embodiments

The present invention is also realized by executing the following processing. Software (i.e., a program) for realizing a function of each of the above described exemplary embodiments is supplied to a system or a device via a network or various types of storage medium, and a computer (or CPU, MPU, or the like) of the system or the device reads out and executes the program.

The present invention may be applied to a system including a plurality of devices or may be applied to a singular device. The present invention is not limited to the above described exemplary embodiments but can be modified (including organic combinations of each exemplary embodiment) without departing from the spirit of the present invention. More specifically, the modifications of the present invention are not excluded from the scope of the present invention. In other words, combinations of the above described each exemplary embodiment and the modification thereof also fall under the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-086935 filed Apr. 11, 2011, which is hereby incorporated by reference herein in its entirety.

What is claimed is:

1. An image forming apparatus communicable with a server system that delivers firmware, comprising:
   a storing unit configured to store the firmware after it is delivered from the server system and before it is applied;
   a notification unit configured to notify a start of application of the firmware to the server system in a case where the application of the firmware stored in the storing unit to the image forming apparatus is started in response to an instruction from a user;

a first application unit configured to perform control that the firmware is applied to the image forming apparatus in a case where a response to the effect that the application of the firmware is permitted is received from the server system in reply to the notification of the notification unit, and that the firmware is not applied to the image forming apparatus in a case where a response to the effect that the application of the firmware is prohibited is received;

a first confirmation unit configured to periodically confirm whether the firmware stored in the storing unit before the application, is to be deleted, to the server system; and a delete unit configured to delete the firmware stored in the storing unit before the application in a case where a response to the effect that the firmware is to be deleted is received from the server system in reply to the confirmation of the first confirmation unit;

wherein the response to the effect that the application of the firmware is prohibited is transmitted from the server system in order to prevent the application of the firmware that is in a release stop status in the server system during a period after the firmware is delivered and before the application of the firmware is started in the image forming apparatus.

2. The image forming apparatus according to claim 1, wherein the first application unit deletes the firmware from the storing unit in a case where a response to the effect that the application of the firmware is prohibited is received in replay to the notification of the notification unit.

3. The image forming apparatus according to claim 1, further comprising:

a second confirmation unit configured to periodically confirm presence or absence of the firmware to be delivered to the image forming apparatus, to the server system;

a delivery requesting unit configured to request the server system to deliver the firmware in a case where a response to the effect that there is the firmware to be delivered is received in reply to the confirmation of the second confirmation unit;

a receiving unit configured to receive the firmware delivered from the server system in response to the request of the delivery requesting unit and store the firmware in the storing unit; and a second application unit configured to apply the firmware to the image forming apparatus in a case where an instruction is given to the effect that an automatic application is performed in the server system on the firmware that is received by the receiving unit and stored in the storing unit.

4. A network system including an image forming apparatus and a server system for delivering firmware to the image forming apparatus:

wherein the image forming apparatus comprises, a storing unit configured to store the firmware after it is delivered from the server system and before it is applied;

a notification unit configured to notify a start of the application of the firmware to the server system in a case where application of the firmware stored in the storing unit to the image forming apparatus is started in response to an instruction from a user;

a first application unit configured to perform control that the firmware is applied to the image forming apparatus in a case where a response to the effect that the application of the firmware is permitted is received from the server system in reply to the notification of the notification unit, and that the firmware is not applied to the image forming apparatus in a case where a response to the effect that the application of the firmware is prohibited is received;

a first confirmation unit configured to periodically confirm whether the firmware stored in the storing unit before the application is to be deleted, to the server system; and a delete unit configured to delete the firmware stored in the storing unit before the application in a case where a response to the effect that the firmware is to be deleted is received from the server system in reply to the confirmation of the first confirmation unit; and wherein the server system comprises, a first reply unit configured to make a response to the effect that the application of the firmware to the image forming apparatus is permitted or prohibited by determining whether the application of the firmware delivered to the image forming apparatus is permitted or prohibited in reply to the notification from the image forming apparatus that is made in a case where the application of the delivered firmware is started in response to the instruction from the user in the image forming apparatus; and a second reply unit configured to make a response to the effect that the firmware is deleted or not deleted to the image forming apparatus by determining whether the firmware after it is delivered to the image forming apparatus and before it is applied, is deleted in reply to a periodical firmware delete confirmation from the image forming apparatus before the application.

5. The network system according to claim 4, wherein the first application unit deletes the firmware from the storing unit in a case where the response to the effect that the application of the firmware is prohibited is received in reply to the notification of the notification unit.

6. The network system according to claim 4:

wherein the server system comprises, a first detection unit configured to detect the image forming apparatus to which a specific firmware is delivered; and a first instruction unit configured to receive the instruction to prohibit the application of the delivered firmware to the image forming apparatus detected by the first detection unit and store the contents of the received instruction in the storage unit;

wherein the first reply unit and the second reply unit make determinations based on the contents of the instructions stored in the storage unit.

7. The network system according to claim 6:

wherein the image forming apparatus further comprises, a second confirmation unit configured to periodically perform a delivery confirmation to confirm presence or absence of the firmware to be delivered to the image forming apparatus, to the server system;

a delivery requesting unit configured to request the server system to deliver the firmware in a case where a response to the effect that there is the firmware to be delivered is received in reply to the confirmation from the second confirmation unit; and a receiving unit configured to receive the firmware delivered from the server system in response to the request of the delivery requesting unit and store the firmware in the storing unit; and wherein the server system further comprises, a second detection unit configured to detect the image forming apparatus to which a specific firmware is applied;

a second instruction unit configured to, in a case where an instruction for performing a rollback is received in which the firmware that is already applied to the image forming apparatus detected by the second detection unit is returned to the firmware having the version prior to the version of the firmware having been applied to the image forming apparatus detected by the detection unit, register the firmware of the prior version in the storage unit as the firmware to be delivered;

a third reply unit configured to transmit presence or absence of the firmware to be delivered to the image forming apparatus, in reply to the image forming apparatus by determining the presence or the absence of the firmware to be delivered to the image forming apparatus according to the periodical delivery confirmation from the image forming apparatus; and a delivery unit configured to deliver the firmware to the image forming apparatus in response to the delivery request from the image forming apparatus.

8. The network system according to claim 7, wherein the image forming apparatus further comprises, a second application unit configured to apply the firmware to the image forming apparatus in a case where it is designated that the automatic application is performed in the server system on the firmware received and stored in the storing unit by the reception unit; and wherein, in a case where the instruction for performing the rollback is received, the second instruction unit registers, the firmware of the prior version as the firmware to be delivered in the storage unit, together with the instruction that the automatic application is performed.

9. A method for delivering firmware to an image forming apparatus communicable with a server system, comprising:

notifying a start of application of the firmware to the server system in a case where the application to the image forming apparatus of the firmware stored in the storing unit for storing the firmware after it is delivered from the server system and before it is applied is started in reply to an instruction from a user;

performing control that the firmware is applied to the image forming apparatus in a case where a response to the effect that the application of the firmware is permitted is received from the server system in reply to the notification made in the notifying processing, and that the firmware is not applied to the image forming apparatus in a case where a response to the effect that the application of the firmware is prohibited is received;

confirming periodically whether the firmware stored in the storing unit before it is applied is to be deleted, to the server system; and deleting the firmware stored in the storing unit before it is applied in a case where a response to the effect that the firmware is to be deleted is received from the server system in reply to the confirmation made in the confirming processing;

wherein the response to the effect that the application of the firmware is prohibited is transmitted from the server system in order to prevent the application of the firmware that is in a release stop status in the server system, during a period after the firmware is delivered and before the application of the firmware is started in the image forming apparatus.

10. A non-transitory computer readable storage medium on which is stored a computer program for making a computer execute a method for an image forming apparatus, the method comprising:

notifying a start of an application of firmware to the server system in a case where the application to the image forming apparatus of the firmware delivered from the server system and stored in the storing unit that stores the firmware before the application, is started in response to an instruction from a user;

performing control that the firmware is applied to the image forming apparatus in a case where a response to the effect that the application of the firmware is permitted is received from the server system in reply to the notification notified in the notifying processing, and that the firmware is not applied to the image forming apparatus in a case where a response to the effect that the application of the firmware is prohibited is received;

confirming periodically whether the firmware stored in the storing unit before the application, is to be deleted, to the server system; and deleting the firmware stored in the storing unit before the application in a case where a response to the effect that the firmware is to be deleted is received from the server system in reply to the confirmation made in the confirming processing;

wherein the response to the effect that the application of the firmware is to be prohibited is transmitted from the server system in order to prevent the application of the firmware, which is in a release stop status in the server system, from being applied during a period after the firmware is delivered and before the application of the firmware is started in the image forming apparatus.

* * * * *